United States Patent
Resch

(10) Patent No.: US 9,690,513 B2
(45) Date of Patent: Jun. 27, 2017

(54) DISPERSED STORAGE PROCESSING UNIT AND METHODS WITH OPERATING SYSTEM DIVERSITY FOR USE IN A DISPERSED STORAGE SYSTEM

(75) Inventor: Jason K. Resch, Chicago, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 280 days.

(21) Appl. No.: 12/749,606

(22) Filed: Mar. 30, 2010

(65) Prior Publication Data

US 2011/0055273 A1 Mar. 3, 2011

Related U.S. Application Data

(60) Provisional application No. 61/237,624, filed on Aug. 27, 2009.

(51) Int. Cl.
*G06F 7/00* (2006.01)
*G06F 3/06* (2006.01)
*H04L 29/08* (2006.01)

(52) U.S. Cl.
CPC ............ *G06F 3/0643* (2013.01); *G06F 3/064* (2013.01); *G06F 3/067* (2013.01); *G06F 3/0619* (2013.01); *G06F 3/0622* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 4,092,732 A | 5/1978 | Ouchi | |
| 4,714,992 A * | 12/1987 | Gladney | G06F 17/30575 |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 * | 2/2001 | Garay | H04L 9/302 713/153 |

(Continued)

FOREIGN PATENT DOCUMENTS

GB 2442285 A * 4/2008 ....... G06F 17/30194

OTHER PUBLICATIONS

Shamir; How to Share a Secret; Communications of the ACM; vol. 22, No. 11; Nov. 1979; pp. 612-613.

(Continued)

*Primary Examiner* — Hasanul Mobin
(74) *Attorney, Agent, or Firm* — Garlick & Markison; Timothy W. Markison; Harry S. Tyson, Jr.

(57) ABSTRACT

A plurality of data slices are generated from a block of data to be stored in the dispersed storage system. A plurality of dispersed storage units are determined for storing the plurality of data slices, based on an operating system associated with the plurality of dispersed storage units.

10 Claims, 14 Drawing Sheets

(56) References Cited

U.S. PATENT DOCUMENTS

| | | | |
|---|---|---|---|
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1* | 2/2006 | Pittelkow | G06F 11/2092 714/4.2 |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 7,823,009 B1* | 10/2010 | Tormasov | G06F 11/1076 714/6.12 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0154267 A1* | 8/2003 | Camacho et al. | 709/223 |
| 2004/0024963 A1 | 2/2004 | Talagala et al. | |
| 2004/0122917 A1* | 6/2004 | Menon | G06F 17/30194 709/219 |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1* | 6/2005 | Schmisseur | G06F 11/1076 711/114 |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0152761 A1* | 7/2006 | Sergey | 358/1.16 |
| 2006/0156059 A1 | 7/2006 | Kitamura | |
| 2006/0224603 A1 | 10/2006 | Correll, Jr. | |
| 2006/0239459 A1* | 10/2006 | Yamamichi | H04L 9/3093 380/255 |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0070337 A1* | 3/2009 | Romem | G06F 17/30575 |
| 2009/0094250 A1* | 4/2009 | Dhuse et al. | 707/10 |
| 2009/0094251 A1 | 4/2009 | Gladwin et al. | |
| 2009/0094318 A1 | 4/2009 | Gladwin et al. | |
| 2009/0094320 A1* | 4/2009 | Palthepu | G06F 17/30106 709/203 |
| 2009/0144422 A1* | 6/2009 | Chatley et al. | 709/226 |
| 2010/0023524 A1 | 1/2010 | Gladwin et al. | |
| 2010/0162004 A1* | 6/2010 | Dodgson et al. | 713/193 |
| 2010/0268966 A1* | 10/2010 | Leggette | G06F 21/6227 713/193 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

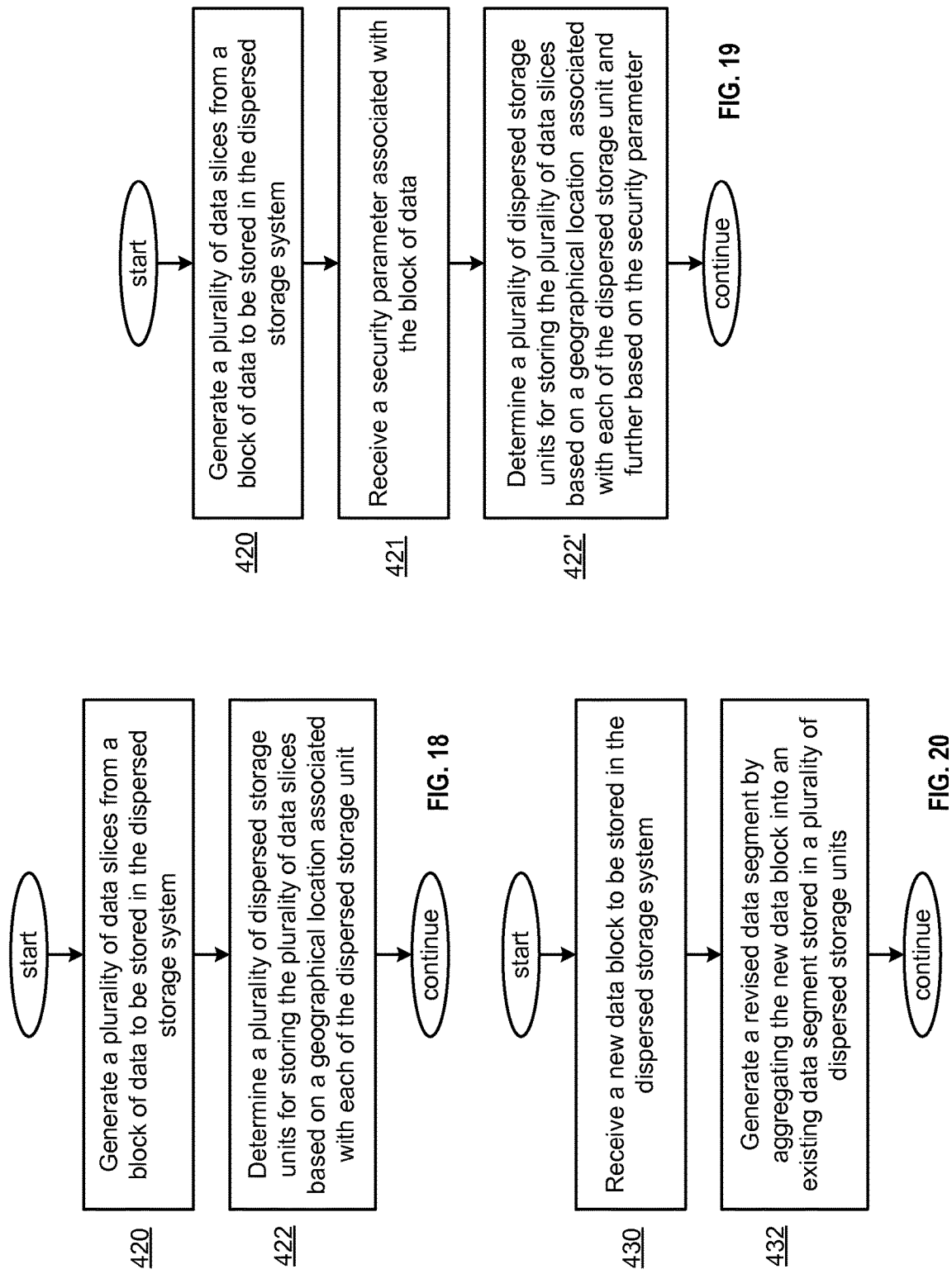

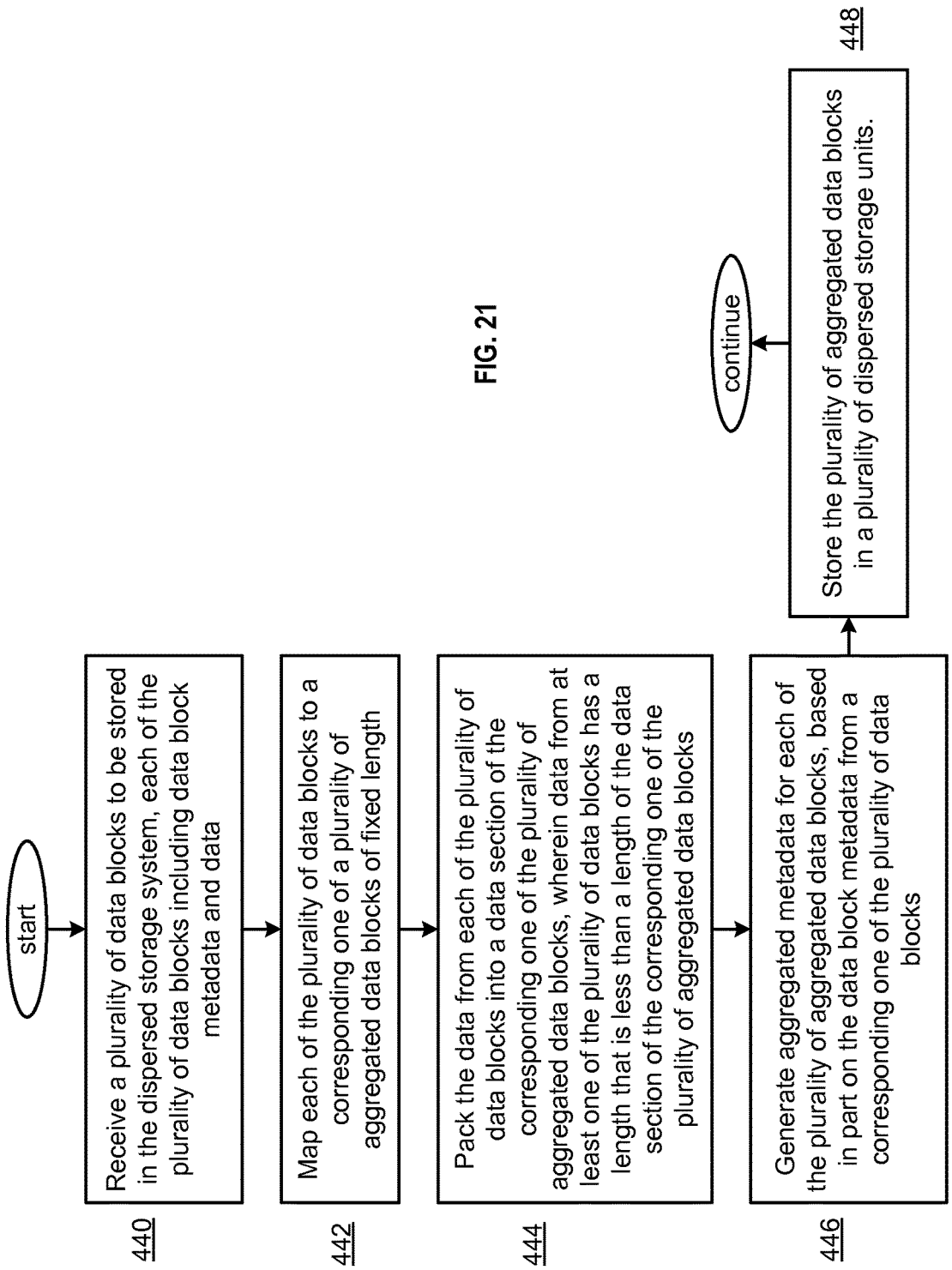

DISPERSED STORAGE PROCESSING UNIT AND METHODS WITH OPERATING SYSTEM DIVERSITY FOR USE IN A DISPERSED STORAGE SYSTEM

CROSS REFERENCE TO RELATED APPLICATIONS

This patent application is claiming priority under 35 USC §119 to a provisionally filed patent application entitled EFFICIENT STORAGE IN A DISPERSED STORAGE NETWORK, having a provisional filing date of Aug. 27, 2009, and a provisional Ser. No. 61/237,624.

In addition, this patent application is related to the following U.S. patent applications that are commonly owned:

DISPERSED STORAGE UNIT AND METHODS WITH METADATA SEPARATION FOR USE IN A DISPERSED STORAGE SYSTEM, having application Ser. No. 12/749,583 filed Mar. 30, 2010.

DISPERSED STORAGE PROCESSING UNIT AND METHODS WITH DATA AGGREGATION FOR USE IN A DISPERSED STORAGE SYSTEM, having application Ser. No. 12/749,592 filed Mar. 30, 2010.

DISPERSED STORAGE PROCESSING UNIT AND METHODS WITH GEOGRAPHICAL DIVERSITY FOR USE IN A DISPERSED STORAGE SYSTEM, having application Ser. No. 12/749,625 filed Mar. 30, 2010.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISK

NOT APPLICABLE

BACKGROUND OF THE INVENTION

Technical Field of the Invention

This invention relates generally to computing systems and more particularly to memory within such computing systems.

Description of Related Art

Computing systems are known to communicate, process, and store data. Such computing systems range from wireless smart phones, to an individual computer, to a network of computers, to data centers that support millions of web searches, stock trades, and/or on-line purchases. The data storage part of the computing system typically includes one or more memory devices corresponding to the various operational aspects of the processing and communication functions. For example, read only memory (RAM) memory is typically used for the main memory of the computing system because it can accessed in any random order with a constant response time. As another example, memory device technologies that require physical movement (e.g., magnetic disks, tapes, RAID (redundant array of inexpensive disks), and/or optical disks) are used for secondary storage of the computing system since they have a variable responses time as the physical movement can take longer than the data transfer.

Each memory device used in a computing device operates in accordance with one or more storage standards (e.g., network file system (NFS), flash file system (FFS), disk file system (DFS), small computer system interface (SCSI), internet small computer system interface (iSCSI), file transfer protocol (FTP), and web-based distributed authoring and versioning (WebDAV)). Despite standardized operations, memory devices fail; especially disk drives that are used in a stand-alone mode. For example, it is common for a commercial grade disk drive to suffer from bit level corruption during its life, which, on average, is about three years. One obvious solution for reducing disk drive failures is to use higher quality disk drives, which have a longer life, but are significantly more expensive.

Another solution for reducing the risk for losing data due a disk drive failure is to use redundant disk drives (e.g., RAID), which replicates the data into two or more copies. RAID includes an array of disk drives that store parity data and the original data. The parity data is calculated such that the failure of one or more disks will not result in the loss of the original data. For example, RAID 5 uses three or more disks to protect data from the failure of any one disc. In a three disk RAID 5 array, the parity data adds about 50% overhead to the storage of the original data. As another example, RAID 6 can recover from a loss of two disks and requires a minimum of four disks with an efficiency of (n−2)/n where n is the number of disks.

While RAID offers many advantages over stand-alone disk drivers, disk drives within RAID fail and data can be lost. For instance, as more disks are added, the probability of one or more disks failing rises, especially if lower quality disks are used. When one disk fails, if it not replaced before another disk fails, then data is lost. To reduce the risk of losing data, mirroring of RAID arrays at different physical locations is used. While this reduces the risk of losing data, it increases the vulnerability of the data to unauthorized access.

BRIEF DESCRIPTION OF THE SEVERAL VIEWS OF THE DRAWING(S)

FIG. 18 is a flow chart representation of an embodiment of a method for storage dispersion in accordance with the present invention;

FIG. 19 is a flow chart representation of an embodiment of a method for storage dispersion in accordance with the present invention;

FIG. 20 is a flow chart representation of an embodiment of a method for storage dispersion in accordance with the present invention; and FIG. 21 is a flow chart representation of an embodiment of a method for storage dispersion in accordance with the present invention.

DETAILED DESCRIPTION OF THE INVENTION

Figure 1:
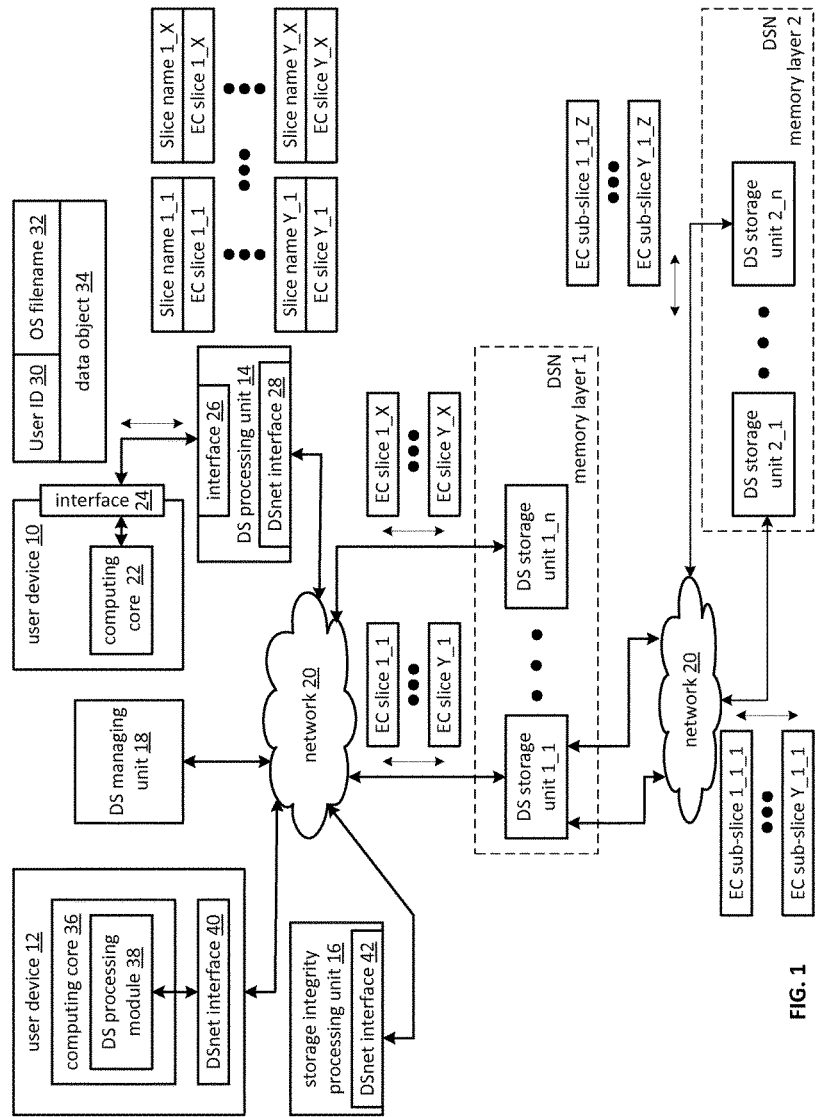
FIG. 1 is a schematic block diagram of an embodiment of a computing system in accordance with the invention.

FIG. 1 is a schematic block diagram of an embodiment of a computing system that includes a first user device 10, a dispersed storage (DS) processing unit 14, a plurality of dispersed storage network (DSN) memory layers 1 & 2 (but could include more than two), a storage integrity processing unit 16, a second user device 12, a DS managing unit 18, and a network 20. Each of the DSN memory layers include a plurality of dispersed storage (DS) storage units 1-n, where n can be 1, 2, 3 or more and can vary from layer to layer. Note that a DS storage unit can be in one or more DSN memory layers. The DSN memory layers can be a subset of the total set of DS storage units.

Each of the user devices 10 and 12 (note that the system can include more than 2 user devices) can be a portable device and/or a fixed device. For example, a portable device can be a cell phone, a smart phone, a personal digital assistant, a digital music player, a digital video player, a laptop computer, a handheld computer, a video game controller, and/or any other portable computing equipment. A fixed device can be a personal computer, a computer server, a cable set-top box, a satellite receiver, a television set, a printer, a fax machine, home entertainment equipment, a video game console, and/or any type of home or office computing equipment.

The user device 10 includes a computing core 22 (which will be described in greater detail with reference to FIG. 3) and an interface 24. The interface 24, which includes hardware and/or firmware, communicates with the DS processing unit 14 using one or more storage system standards such that the user device 10 utilizes a storage standard native to its operating system. The user device 12 includes a computer core 36 (which can be of the same construct as the computing core 22 of user device 10) and a DS network interface 40. The computing core 36 includes a DS processing module 38.

Each of the DS processing unit 14, the DS storage units, the storage integrity processing unit 16, and/or the DS managing unit 18 can be a portable device, can be a fixed device, and/or can be a functional module within another unit and/or device. For example, the DS managing unit 18 can be a computer server and the storage integrity processing unit 16 can be a functional module operating on the computer server. In another example, the DS processing unit 14 can be a DS processing module operating on the same computing device as one of the DS storage units. Further, each of the DS processing unit 14, the DS storage units, the storage integrity processing unit 16, the DS managing unit 18 includes a DS network interface 28, 40, 42 (whether shown or not). The DS network interface provides connectivity to the network 20 and includes the hardware and/or firmware to support the protocol of the network (e.g, LAN, WLAN, WAN, public switching network, the internet, etc.).

The network 20 can be a wire lined and/or wireless communication system or a system of systems that provide communications capability between the devices and units. The system of systems can be a combination of private intranets and the public internet. For example, the DS processing unit 14 has access to the network 20 by way of an optical sub-network and the second user device 12 has access to the network 20 by way of a 4G Long Term Evolution (LTE) wireless network. As another example, the DS storage units can communicate with each other via the network 20 and/or via direct connections there-between, whether they are in the same DSN memory layers or a different DSN memory layer.

In an example of operation of the computing system, the computing core 22 of the user device 10 initiates the sequence to store data by transmitting a data object 34 to the DS processing unit 14 via the interfaces 24 and 26. The data object 34 can include a data file, data blocks, a real time data stream and/or any other format of digital information. The data object can further include a user identification code (ID) 30 and an operating system (OS) filename 32 to mimic a conventional file system interface and/or block system interface (e.g., network file system (NFS), flash file system (FFS), disk file system (DFS), small computer system interface (SCSI), internet small computer system interface (iSCSI), file transfer protocol (FTP), and web-based distributed authoring and versioning (WebDAV)).

The DS processing unit 14 receives the data, or data object 34, and breaks it down into Y data segments. For example, if the data object is 1 Giga-Byte (GB), the DS processing unit 14 can segment the data object into 1000 1 Mega-Byte (MB) data segments. The DS processing unit 14 then error encodes (e.g., using an error encoding function such as a forward error correction function, an information dispersal algorithm, etc.) each data segment to produce X error coded (EC) slices per data segment. The value X represents the width of the error encoding function. For example, X can range from 4 to 256 or more. The number of slices X per segment can also be referred to pillars.

The DS processing unit 14 creates a unique slice name (e.g., 1_1; 1_X; Y_1; Y_X) for each error coded (EC) data slice and attaches the slice name to each EC data slice (e.g., 1_1; 1_X; Y_1; Y_X). The slice name includes universal DSN memory layer addressing routing information and user-specific information based on the OS filename 32 to tie the two together.

The DS processing unit 14 can also determine to further error encode one or more of the slices of a segment (i.e., sub-slicing). Such a determination can be based on a number of factors. For example, the DS processing unit 14 can determine that further security can be obtained by sub-slicing a select number (e.g., a security threshold) of the slices per segment, which can be from the same pillars for each segment or from different pillars from segment to segment. As a specific example, if the width (i.e., X) is 16 and the read threshold (e.g., minimum number of slices required to reconstruct the data segment) is 10, then 7 or more slices per segment can be sub-sliced such that a read threshold cannot be achieved without reconstructing a slice from the sub-slices.

The DS processing unit 14 can also determine to sub-slice at least one slice of a data segment for a number of other reasons. For example, one or more of retrieval latency for each of the DS storage units; priority of the selected encoded slice; a data type of the data segment; availability of each of DS storage units; and/or cost of storing an encoded slice in each of the DS storage units can affect the determination to sub-slice.

The DS processing unit 14 can perform the sub-slicing of one or more slices itself or can instruct one or more of the DS storage units to perform the sub-slicing. When the DS processing unit 14 performs the sub-slicing, it adds memory layer 2 slice names to the sub-slices (e.g., 1_1_1; Y_1_1; 1_1_Z; Y_1_Z), where Z corresponds to the width of the sub-slicing. When the DS processing unit 14 wants a DS storage unit to perform the sub-slicing, it generates a corresponding command. As another example, the DS processing unit 14 does not initiate the sub-slicing; one or more of the DS storage units makes the determination for the slices it is to store.

Having generated the EC slices and rendered a decision regarding sub-slicing (or no decision), the DS processing unit 14 sends the EC slices 1 through X of a data segment to the DS storage units 1_1 through 1_n of the first DSN memory layer. The DS processing unit 14 can also send a command regarding sub-slicing with one or more of the EC slices to the corresponding DS storage unit. For example, if the DS processing unit 14 has determined that the first slice (e.g., 1_1; Y_1) of each segment is to be sub-sliced, it sends the command to DS storage unit 1_1 with at least the first slice (e.g., 1_1). Note that the command can be for an individual data segment, the data object, or a portion thereof.

Upon receiving an EC slice, a DS storage unit determines whether it will sub-slice the EC slice. Such a determination can be based on receiving a command from the DS processing unit 14 or an individual determination based on at least some of the same factors that the DS processing unit 14 can use to render a sub-slicing decision. If the DS storage unit is not to sub-slice the EC slice, it translates the virtual DSN memory layer address of the slice name into a local physical address and stores the EC slice at the physical address.

If a DS storage unit determines that it is to sub-slice an EC slice, it creates EC data sub-slices the EC data slice using a sub-slicing algorithm (e.g., a forward error correction algorithm, an information dispersal algorithm, etc.). In addition, the DS storage unit creates a unique sub-slice name (e.g., 1_1_1; 1_1_Z; Y_1_1; Y_1_Z, where Z corresponds to the width of the sub-slicing algorithm) for each sub-slice and attaches it to the corresponding sub-slice. The sub-slice names can also include universal DSN memory layer addressing routing information and user-specific information to tie the two together.

The DS storage unit can also determine to further sub-slice at least one sub-slice of an EC slice for similar reasons used by the DS processing unit to determine whether to sub-slice an EC slice. The DS storage unit can perform the further sub-slicing of a sub-slice itself or can instruct one or more of the DS storage units of the next memory layer to perform the further sub-slicing. When the DS storage unit performs the further sub-slicing, it adds memory layer 3 further sub-slice names to the sub-slices (e.g., 1_1_1_1; Y_1_1_1; 1_1_1_A; Y_1_1_A), where A corresponds to the width of the further sub-slicing. When the DS storage unit wants a DS storage unit to perform the further sub-slicing, it generates a corresponding command.

Having generated the sub-slices and rendered a decision regarding further sub-slicing, the DS storage unit sends the sub-slices 1_1 through 1_Z of an EC slice to the DS storage units 2_1 through 2_n of the seconds DSN memory layer. The DS storage unit can also send a command regarding further sub-slicing of one or more of the sub-slices to the corresponding DS storage unit.

Storage of data for the user device 12 operates in a similar manner as described above, with the exception that the user 12 includes the DS processing unit functionality within its computer core 36. More specifically, the user device 12 includes a DS processing module 38, which performs similar functions as performed by the DS processing unit 14.

In another example of operation, the DS managing unit 18 functions to receive and aggregate network management alarms, alerts, errors, status information, performance information, and/or messages from the modules and/or units of the computing system. The DS managing unit 18 functions can also include functions to configure the computing system and perform a billing function for the computing system. For example, the DS managing unit 18 can determine the number of DS storage units to configure to meet the operation requirements of a particular user. The configuration can include assignment of DSN memory layer addresses. In another example, the DS managing unit can track the usage of the DSN memory layers by the user to create a summary and/or bill. The DS managing unit 18 can also automatically determine optimization of the configuration of the computing system based in part from determining the correlation of past and present configurations with performance. The DS managing unit 18 can share the correlation and configurations with other computing systems managing a different DSN memory layers to further optimize the computing system.

In another example of operations, the storage integrity processing unit 16 scans the contents of the DSN memory layers to detect undesired conditions including data corruption, missing data, out of date data, and/or offline DS storage units. When the storage integrity processing unit 16 detects an undesired condition, it rebuilds a portion of the data in the DSN memory layers and alerts the DS managing unit 18 when undesired conditions are detected. The storage integrity processing unit 16 rebuilds the data by retrieving available data, processing the available data to produce rebuilt data, and storing the rebuilt data in the DSN memory layers. The process to produce rebuilt data will be described in greater detail with reference to FIGS. 4-6.

Figure 2:
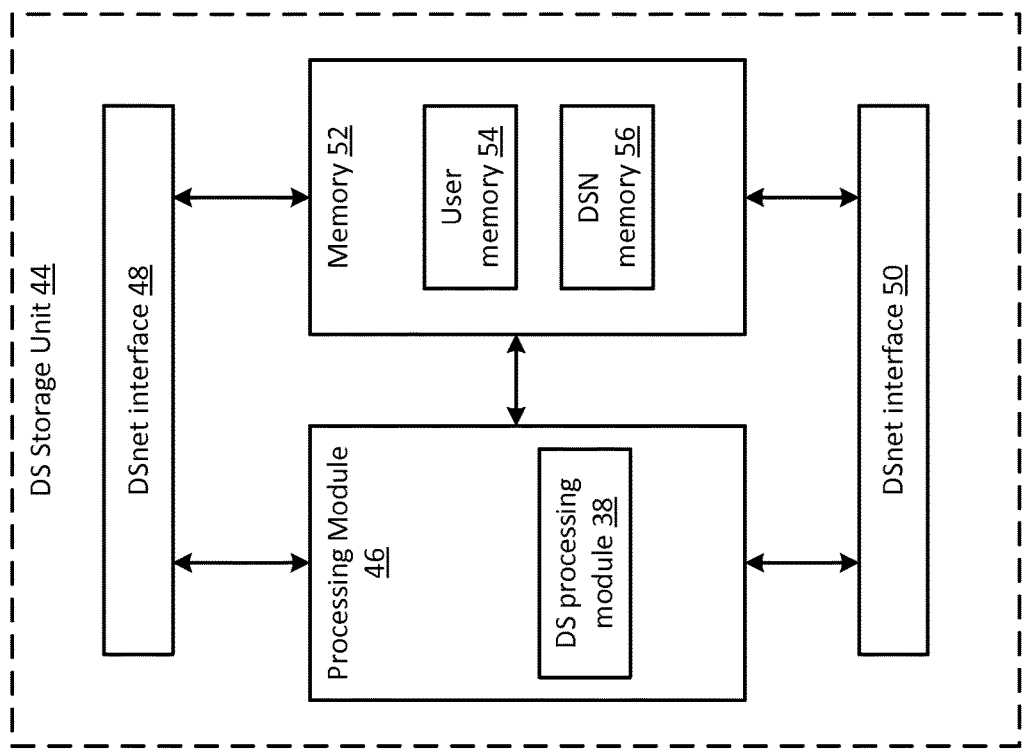
FIG. 2 is a schematic block diagram of an embodiment of a dispersed storage (DS) storage unit in accordance with the invention.

FIG. 2 is a schematic block diagram of an embodiment of a dispersed storage (DS) storage unit 44 (e.g., any of the DS storage units of FIG. 1) that includes a processing module 46, at least one DSnet interface 48-50, and a memory 52. The processing module 46 includes a DS processing module 38 and can be a single processing device or a plurality of processing devices. Such a processing device can be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module can have an associated memory and/or memory element, which can be a single memory device, a plurality of memory devices, and/or embedded circuitry of the processing module. Such a memory device can be a read-only memory, random access memory, volatile memory, non-volatile memory, static memory, dynamic memory, flash memory, cache memory, and/or any device that stores digital information. Note that if the processing module includes more than one processing device, the processing devices can be centrally located (e.g., directly coupled together via a wired and/or wireless bus structure) or can be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions can be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions described herein.

In an example of operation, the processing module 46 receives, via the DSnet interface 48, an EC data slice (or sub-slice) for storage and can further receive a command regarding further sub-slicing of the EC data slice. When the command is received, the processing module 46 interprets it to determine whether the EC slice is to be sub-sliced. Note that the command can include instructions not to sub-slice the EC slice, can include instructions that the EC slice is to be sub-sliced and the sub-slicing function to use, or it can include an instruction to sub-slice leaving the details to the DS storage unit 44.

When a command is received and it includes instructions to sub-slice, the DS processing module 38 performs the sub-slicing as described with reference to FIG. 1. When a command is not received, the processing module 46 determines whether to sub-slice the received EC slice (or sub-slice). Such a determination can be made based on demands of user memory 54 and/or of DSN memory 56. For instance, if the DSN memory 56 has limited availability, then sub-slicing and storing the EC slice elsewhere can be preferred. In this instance, the processing module 46 determines how to re-disperse the EC slice (or sub-slice). The determination can be based on guidance from one or more of a user vault (e.g., stored parameters for this user), a command from the DS managing unit or other system element, priority of the EC data slice, type of data in the EC data slice, and/or retrieval speed requirements. The re-dispersion guidance can include the parameters for encoding, slicing and which DS storage units 44 to utilize.

Having rendered a decision on how to sub-slice, the processing module 46 creates EC sub-slices and sends the EC data sub-slices to other DS storage units via the DSnet interface 50. In addition, the processing module 46 updates a virtual DSN address to physical location table with the locations of the EC data sub-slices. The processing module 46 can store the virtual DSN address to physical location table in the user memory 54 and/or can send the table to another DSN element (e.g., a higher memory level DS storage unit, the DS processing unit 14, the DS managing unit 18, the storage integrity processing unit 16, and/or the user device 10, 12).

Figure 3:
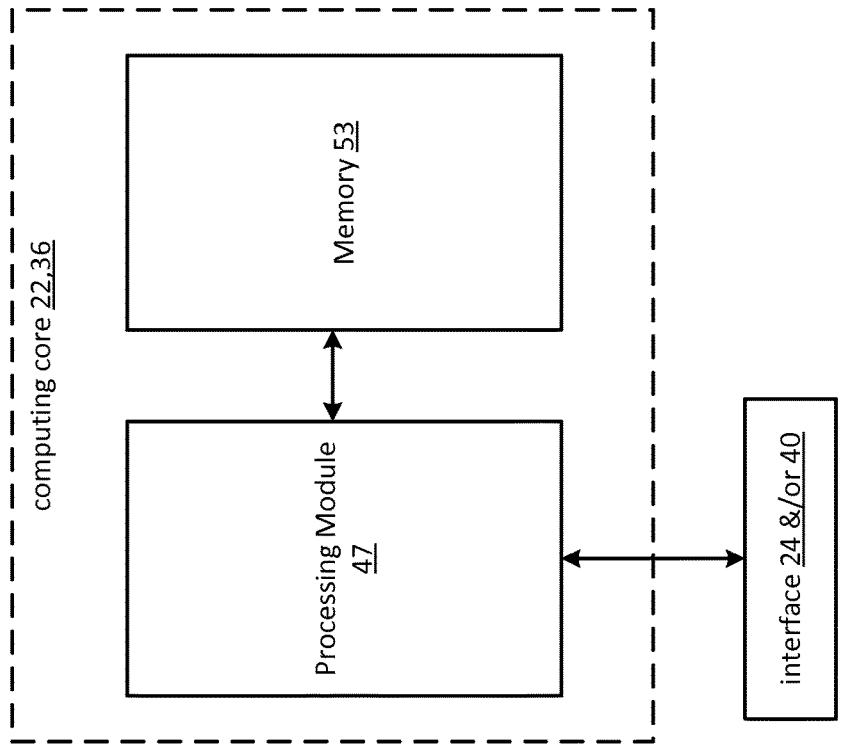
FIG. 3 is a schematic block diagram of an embodiment of a computing core in accordance with the invention.

FIG. 3 is a schematic block diagram of an embodiment of a computing core 22 and/or 36 that includes a processing module 47 and memory 53. The computing core 22 and/or 36 can be of a conventional central processing unit architecture and/or a proprietary architecture. In such a computing core 22 and/or 36, the memory 53 includes cache (levels 1 and/or 2), main memory (e.g., RAM), secondary memory (e.g., internal hard drive, solid-state memory, etc.), and/or backup memory (external hard drive, magnetic tape, etc.). The processing module 47 can be a single processing device or a plurality of processing devices. Such a processing device can be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module can have an associated memory and/or memory element, which can be a single memory device, a plurality of memory devices, and/or embedded circuitry of the processing module. Such a memory device can be a read-only memory, random access memory, volatile memory, non-volatile memory, static memory, dynamic memory, flash memory, cache memory, and/or any device that stores digital information. Note that if the processing module includes more than one processing device, the processing devices can be centrally located (e.g., directly coupled together via a wired and/or wireless bus structure) or can be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions can be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions described herein.

Figure 4:
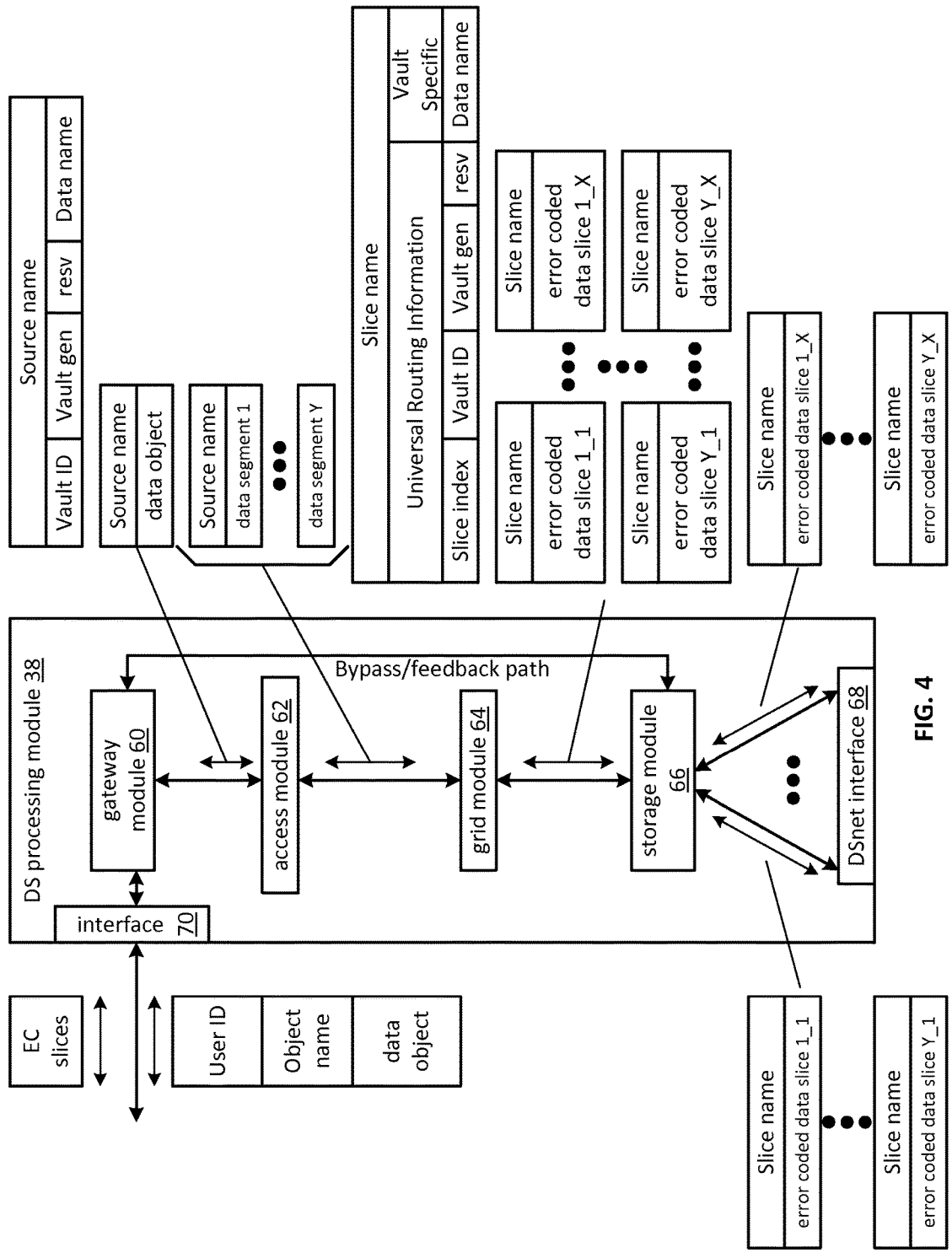
FIG. 4 is a schematic block diagram of an embodiment of a dispersed storage (DS) processing module in accordance with the invention.

FIG. 4 is a schematic block diagram of an embodiment of a dispersed storage (DS) processing module 38 of user device 12 and/or of the DS processing unit 14. The DS processing module 38 includes a gateway module 60, an access module 62, a grid module 64, a storage module 66, and a bypass/feedback path. The DS processing module 38 can also include an interface 70 (e.g., interface 28) and the DSnet interface 68 or the interfaces 68 and/or 70 can be part of user 12 or of the DS processing unit 14.

In an example of storing data, the gateway 60 of the DS processing module 38 receives an incoming data object (e.g., a data file, a data block, an EC data slice, etc.), authenticates the user associated with the data object, obtains user information of the authenticated user, and assigns a source name to the data object in accordance with the user information. To authenticate the user, the gateway module 60 verifies the user ID 30 with the managing unit 18 and/or another authenticating unit. If the user ID is verified, the gateway module 60 retrieves the user information from the managing unit 18, the user device, and/or the other authenticating unit based on the user ID.

The user information includes a vault identifier, operational parameters, and user attributes (e.g., user data, billing information, etc.). A vault identifier identifies a vault, which is a virtual memory space that maps to a set of DS storage units 44. For example, vault 1 (i.e., user 1's DSN memory space) includes eight DS storage units (X=8 wide) and vault 2 (i.e., user 2's DSN memory space) includes sixteen DS storage units (X=16 wide). The operational parameters can include an error coding algorithm, the width n (number of pillars X or slices per segment for this vault), a read threshold T, an encryption algorithm, a slicing parameter, a compression algorithm, an integrity check method, caching settings, parallelism settings, and/or other parameters that can be used to access the DSN memory layer.

The gateway module 60 determines the source name to associate with the data object based on the vault identifier and the data object. For example, the source name can contain a data name (block number or a file number), the vault generation number, the reserved field, and the vault identifier. The data name can be randomly assigned but is associated with the user data object.

The gateway module 60 can utilize the bypass/feedback path to transfer an incoming EC data slice to another DS storage unit 44 when the DS processing module 38 determines that the EC data should be transferred. Alternatively, or in addition to, the gateway module 60 can use the bypass/feedback path to feedback an EC slice for sub-slicing.

The access module 62 receives the data object and creates a series of data segments 1 through Y therefrom. The number of segments Y can be chosen or random based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the source name.

The grid module 64 can pre-manipulate (e.g., compression, encryption, cyclic redundancy check (CRC), etc.) the data segment before creating X error coded data slices for each data segment. The grid module 64 creates XY error coded data slices for the Y data segments of the data object. The grid module 64 adds forward error correction bits to the data segment bits in accordance with an error coding algorithm (e.g., Reed-Solomon, Convolution encoding, Trellis encoding, etc.) to produce an encoded data segment. The grid module 64 determines the slice name and attaches the unique slice name to each EC data slice.

The number of pillars, or slices X per data segment (e.g., X=16) is chosen as a function of the error coding objectives. The DS processing module 58 can utilize different error coding parameters for EC data slices and EC data sub-slices based on guidance from one or more of a user vault (e.g., stored parameters for this user), a command from the DS managing unit or other system element, priority of the EC data slice, type of data in the EC data slice, and/or retrieval speed requirements. A read threshold T (e.g., T=10) of the error coding algorithm is the minimum number of error-free error coded data slices required to be able to reconstruct a data segment. The DS processing unit can compensate for X-T (e.g., 16-10=6) missing error coded data slices per data segment.

The grid module 64, which will be described in greater detail with reference to FIGS. 5 and 6, receives each data segment 1-Y and, for each data segment generates X number of error coded (EC) slices using an error coding function. The grid module 64 also determines the DS storage units 44 for storing the EC data slices based on a dispersed storage memory mapping associated with the user's vault and/or DS storage unit 44 attributes, which include availability, self-selection, performance history, link speed, link latency, ownership, available DSN memory, domain, cost, a prioritization scheme, a centralized selection message from another source, a lookup table, data ownership, and/or any other factor to optimize the operation of the computing system.

The storage module 66 can perform integrity checks on the EC data slices and then transmit the EC data slices 1 through X of each segment 1 through Y to the DS Storage units. The DS storage units 44 can store the EC data slices and locally keep a table to convert virtual DSN addresses into physical storage addresses. Alternatively, the DS storage units 44 can create EC data sub-slices of an EC data slice and re-disperse the EC data sub-slices to other DS storage units 44. Note that the number of DS storage units 44 is equal to or greater than the number of pillars (slices X per segment) so that no more than one error coded data slice of the same data segment is stored on the same DS storage unit 44. Further note that EC data slices of the same pillar number but of different segments (e.g., EC data slice 1 of data segment 1 and EC data slice 1 of data segment 2) can be stored on the same or different DS storage units 44.

In an example of a read operation, the user device 10 sends a read request to the DS processing unit 14, which authenticates the request. When the request is authentic, the DS processing unit 14 sends a read message to each of the DS storage units 44 storing slices of the data object being read. The slices can be received via the DSnet interface 68 and processed by the storage module 66, which performs an integrity check and provides the slices to the grid module 64. In another mode of operation, the integrity check can be performed by each of the DS storage units prior to sending the slices to the DS processing unit 14. The grid module 64 de-slices the slices of a data segment to reconstruct the data segment. The access module reconstructs the data object from the data segments and the gateway module formats the data object for transmission to the user device.

Figures 5, 6:
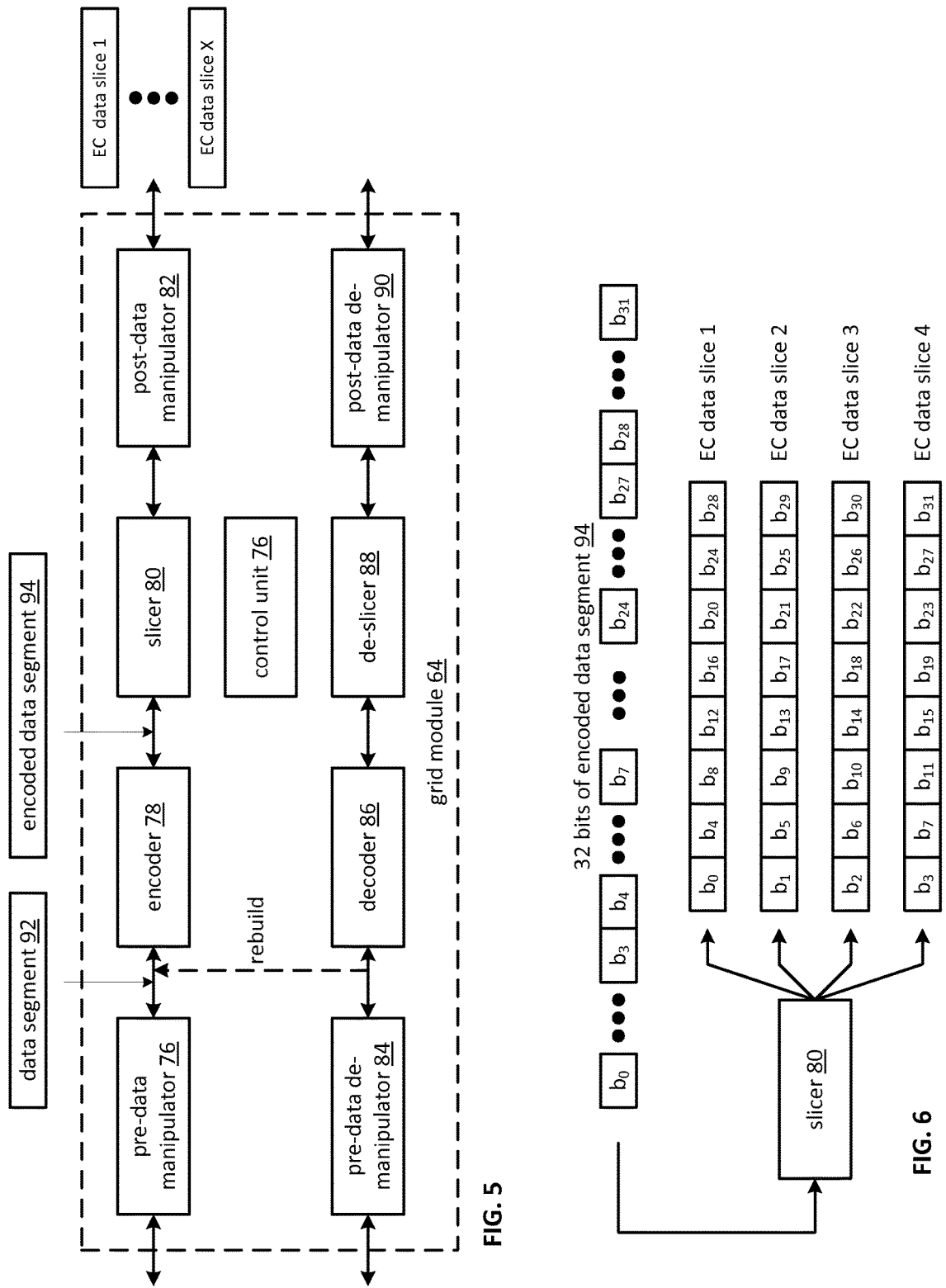
FIG. 5 is a schematic block diagram of an embodiment of a grid module in accordance with the invention.
FIG. 6 is a diagram of an example embodiment of error coded data slice creation in accordance with the invention.

FIG. 5 is a schematic block diagram of an embodiment of a grid module 64 that includes a control unit 76, a pre-data manipulator 76, an encoder 78, a slicer 80, a post-data manipulator 82, a pre-data de-manipulator 84, a decoder 86, a de-slicer 88, and/or a post-data de-manipulator 90. Note that the control unit 76 can be partially or completely external to the grid module 64. For example, the control unit 76 can be part of the computing core at a remote location, part of a user device, part of the DS managing unit 18, or distributed amongst one or more DS storage units.

In an example of write operation, the pre-data manipulator 76 receives a data segment 92 and a write instruction from an authorized user device. The pre-data manipulator 76 determines if pre-manipulation of the data segment 92 is required and, if so, what type. The pre-data manipulator 76 can make the determination independently or based on instructions from the control unit 76, where the determination is based a computing system-wide predetermination, a table lookup, vault parameters associated with the user identification, the type of data, security requirements, available DSN memory, performance requirements, and/or other metadata.

Once a positive determination is made, the pre-data manipulator 76 manipulates the data segment 92 in accordance with the type of manipulation. For example, the type of manipulation can be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to enhance the value of the data segment 92.

The encoder 78 encodes the pre-manipulated data segment 92 using a forward error correction (FEC) encoder to produce an encoded data segment 94. The encoder 78 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm can be Golay, Multidimensional parity, Reed-Solomon, Hamming, Bose Ray Chauduri Hocquenghem (BCH), Cauchy-Reed-Solomon, or any other FEC encoder. Note that the encoder 78 can use a different encoding algorithm for each data segment 92, the same encoding algorithm for the data segments 92 of a data object, or a combination thereof.

The resulting encoded data segment 94 is of greater size than the data segment 92 by the overhead rate of the encoding algorithm by a factor of (X/T), where X is the width or number of slices, and T is the read threshold. In this regard, the corresponding decoding process can accommodate at most X–T missing EC data slices and still recreate the data segment 92. For example, if X=16 and T=10, then the data segment 92 will be recoverable as long as 10 or more EC data slices per segment are not corrupted.

The slicer 80 transforms the encoded data segment 94 into EC data slices in accordance with the slicing parameter from the vault for this user and/or data segment 92. For example, if the slicing parameters are X=16, then the slicer slices each encoded data segment 94 into 16 encoded slices.

The post-data manipulator 82 performs, if enabled, post-manipulation on the encoded slices to produce the EC data slices. The post-data manipulator 82 can be enabled if it determines that post-data manipulation is required. If required, the post-data manipulator 82 determines the type of post-manipulation. The determinations can be based on a computing system-wide predetermination, parameters in the vault for this user, a table lookup, the user identification, the type of data, security requirements, available DSN memory, performance requirements, control unit directed, and/or other metadata. Note that the type of post-data manipulation can include slice level compression, signatures, encryption, CRC, addressing, watermarking, tagging, adding metadata, and/or other manipulation to improve the effectiveness of the computing system.

In an example of a read operation, the post-data de-manipulator 90 receives at least a read threshold number of EC data slices and performs the inverse function of the post-data manipulator 82 to produce a plurality of encoded slices. The de-slicer 88 de-slices the encoded slices to produce an encoded data segment 94. The decoder 86 performs the inverse function of the encoder 78 to recapture the data segment 92. The pre-data de-manipulator 84 performs the inverse function of the pre-data manipulator 76 to recapture the data segment.

FIG. 6 is a diagram of an example of slicing an encoded data segment 94 by the slicer 80. In this example, the encoded data segment includes thirty-two bits, but can include more or less bits. The slicer 80 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 7:
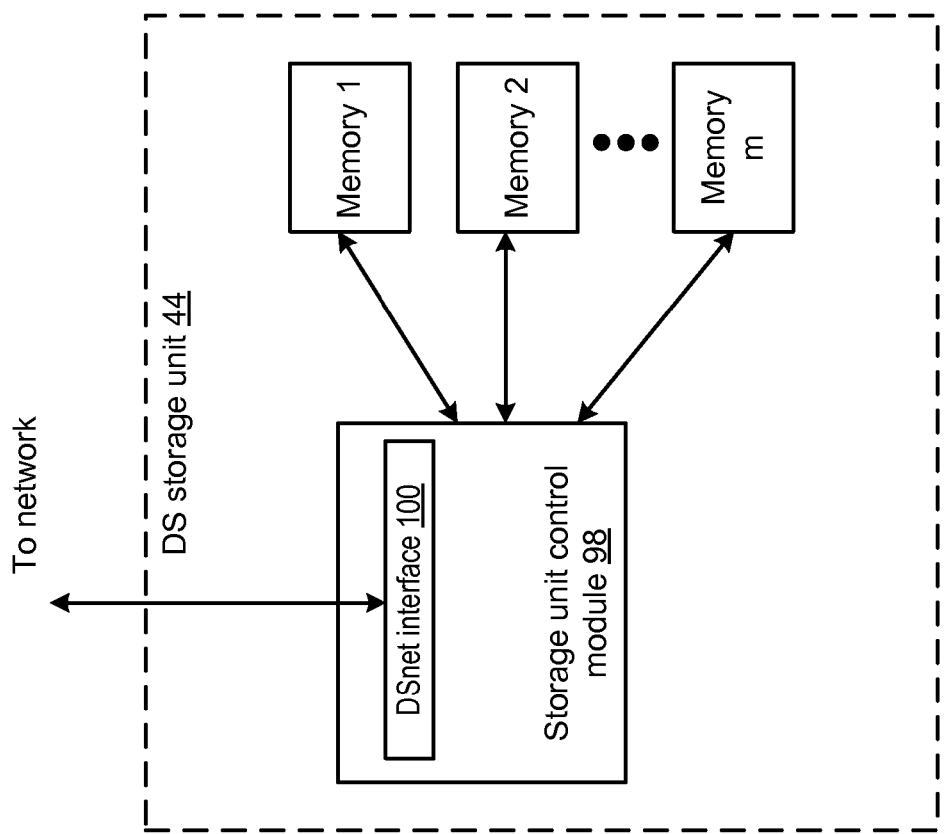
FIG. 7 is a schematic block diagram of an embodiment of a dispersed storage unit in accordance with the invention.

FIG. 7 is a schematic block diagram of an embodiment of a dispersed storage unit in accordance with the invention. In particular, (DS) storage unit 44 includes a storage unit control module 98 and a plurality of memories that includes memory 1 through memory m. The storage unit control module 98 can be implemented with the computing core of FIG. 2. The memories can be one or more of a magnetic hard disk, NAND flash, read only memory, optical disk, and/or any other type of read-only, or read/write memory. The memories can be implemented as part of or outside of the DS storage unit 44. For example, memory 1 can be implemented in the DS storage unit 44 and memory 2 can be implemented in a remote server (e.g., a different DS storage unit 44 operably coupled to the DS storage unit 44 via the network).

The storage unit 44 control module can be operably coupled to the computing system via the DSnet interface 100 via the network. The storage unit control module 98 can receive EC data slices to store via the DSnet interface 100. In an embodiment, the storage unit control module 98 determines how (e.g., EC data slice manipulation) and where (e.g., which address on which of the memories) to store the received EC data slice. The determination can be based on one or more of the metadata, a type of data indicator, a priority indicator, available memory, memory performance data, memory cost data, and/or any other parameter to facilitate desired levels of efficiency and performance. For example, the storage unit control module 98 can choose memory 2 (e.g., a magnetic hard disk drive) to store the received EC data slice since the performance and efficiency is good enough for the EC data slice requirements (e.g., availability, cost, response time).

The storage unit control module 98 can manipulate the received EC data slice prior to storing the EC data slice in the memory. In an embodiment, the storage unit control module 98 can divide the EC data slice into data blocks and can generate a metadata element for each block. The storage unit control module 98 manipulation of the received EC data slice prior to storing the EC data slice in the memory will be discussed in greater detail with reference to FIGS. 8-9.

Figure 8:
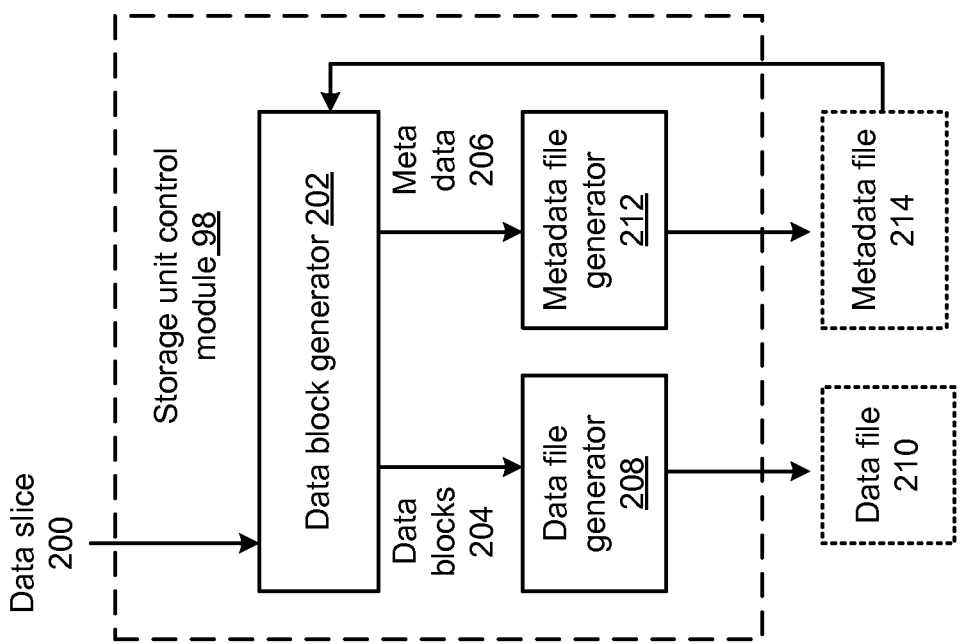
FIG. 8 is a schematic block diagram of an embodiment of a storage unit control module in accordance with the invention.

FIG. 8 is a schematic block diagram of an embodiment of a storage unit control module in accordance with the invention. In particular, storage unit control module 98 includes a data block generator 202 that receives a data slice 200, such as an EC data slice to be stored in a dispersed storage unit 44. Data block generator 202 generates one or more data blocks 204 from the data slice 200 along with metadata 206 associated with each of the data blocks 206. Data file generator 208 generates a data file 210 based on the data blocks 204. Meta data file generator 212 generates a metadata file 214 based on the metadata 206 associated with the data blocks 204. In operation, the metadata file 214 and the data file 210 are stored in either the same or separate memories (1 . . . m) of DS storage unit 44.

In an embodiment of the present invention, the components of storage unit control module 98 are implemented using a single shared processing device or a plurality of processing devices. Each such processing device can be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing device can have an associated memory and/or memory element, which can be a single memory device, a plurality of memory devices, and/or embedded circuitry of the processing device. Such a memory device can be a read-only memory, random access memory, volatile memory, non-volatile memory, static memory, dynamic memory, flash memory, cache memory, and/or any device that stores digital information. Note that if the storage unit control module 98 includes more than one processing device, the processing devices can be centrally located (e.g., directly coupled together via a wired and/or wireless bus structure) or can be distributedly located (e.g., cloud computing via indirect coupling via a local area network and/or a wide area network). Further note that when the processing device implements one or more of its functions via a state machine, analog circuitry, digital circuitry, and/or logic circuitry, the memory and/or memory element storing the corresponding operational instructions can be embedded within, or external to, the circuitry comprising the state machine, analog circuitry, digital circuitry, and/or logic circuitry. Still further note that, the memory element stores, and the processing device executes, hard coded and/or operational instructions corresponding to at least some of the steps and/or functions described herein.

Figure 9:
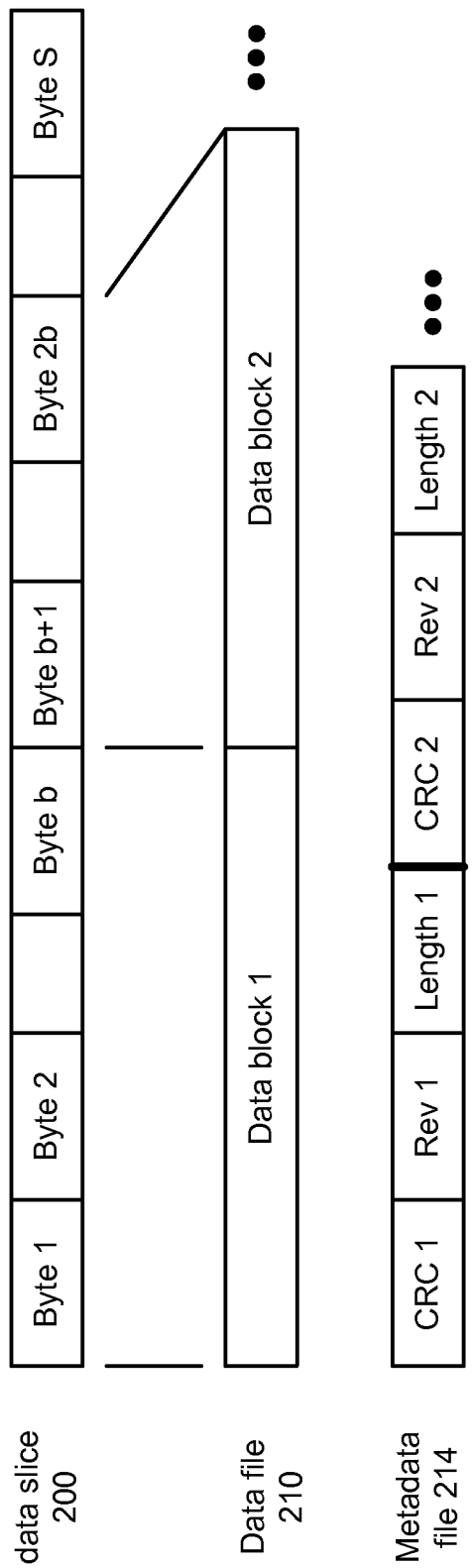
FIG. 9 is a schematic block diagram of an embodiment of data structures in accordance with the invention.

FIG. 9 is a schematic block diagram of an embodiment of data structures in accordance with the invention. In particular, file structures are shown that include an EC data slice structure, a data block file structure, and a metadata file structure. The data block generator 202, data file generator 208 and metadata file generator 212 of storage unit control module 98 operate to receive the data slice 200 in accordance with the EC data slice structure, and to manipulate the data slice 200 to produce a data file 210 in accordance with the data block file structure, and a metadata file 214 in accordance with the metadata file structure.

The EC data slice structure can include byte 1 through byte S such that there are S bytes in the received EC data slice. The data block file structure can include at least one data block and can include a plurality of data blocks sufficient to store a total number of bytes as there received EC data slice data bytes. For example, the data file generator 208 can create the data file 210 with one 16,384 byte data block when the received EC data slice contains less than 16,384 bytes of data (e.g., excluding any naming or metadata). In another example, the data file generator 208 can create the data file 210 with two 16,384 byte data blocks when the received EC data slice contains more than 16,384, but less than 32,768 bytes of data (e.g., excluding any naming or metadata).

The metadata file structure can include one or more metadata elements that indicate properties of the corresponding data block. The metadata file generator 212 can create and add an incremental metadata element to the metadata file 214 for each data block created for the data block file. In the embodiment shown, the metadata file includes a compilation of the metadata elements associated with each of the data blocks.

For example, each metadata element can include a four byte cyclic redundancy check (CRC), error detecting code or other checksum for the corresponding data block (e.g., to verify integrity upon a subsequent read sequence), an eight byte revision indicating which revision number of the data object store, and a four byte length to indicate the number of bytes in the corresponding data block. While a particular data structure is described for the each metadata element, other data structures can likewise be employed. For example, each data block can be identified by an additional block number and the metadata associated with that block can further include an additional metadata element that indicates the block number. Further, an additional metadata element can indicate if a particular data block is full or has been padded with P bytes of padding data.

In operation, the storage unit control module 98 can utilize the length fields of the metadata file 214 to index into the data block file to locate the ith data block. For example, the storage unit control module 98 can read the metadata file to determine that data block 3 is located within the data file 210 beginning one byte after the sum of the length 1 of data block 1 plus the length 2 of data block 2, from the start of the data file 210. In this fashion, the storage unit control module 98 can index directly to data block 3. Note that by creating a metadata file 214 that can be stored and accessed separately from the data file 210, the storage unit control module 98 can determine the location of data block 3 by accessing the metadata file 214 more quickly—when compared to other approaches including one where the metadata is stored within the data blocks in a single file.

In a further example of operation, the storage unit control module 98 can receive an EC data slice such as data slice 200, to manipulate and store. The data block generator 202 divides the data from the EC data slice into one or more data blocks 204. It should be noted that the size of the data blocks can be identical or different as specified in one or more of the user vault, a system parameter, and/or a local DS storage unit parameter. The data block generator 202 can pad out (e.g., filling in with one's, zeroes, or random bits) the unused bytes in the remainder of the last data block when the EC data slice does not completely fill the last data block and the data blocks are all of equal length. The data block generator 202 can access the metadata file 214 to read the length fields to determine (e.g., adding up) an index for the next available block in the data block file. The data block generator 202 creates new metadata elements (e.g., calculate the CRC, pass on the revision, and plug in the block length). In response, the metadata file generator 212 stores new metadata 206 in the metadata file for each of the newly created data blocks 204. The data file generator 208 can index into the data file 210 and store the new data blocks 204.

In addition to the individual metadata elements described above, the metadata file 214 can further include one or more global data elements. For example, the metadata file 214 can include a header, footer or other data structure that indicates, for example, the total length of data file 210, the number of data blocks in data file 210, the block number or index of the last data block, the index of the end of the last data block, an indicator of whether or not the last data block is full and/or the number of padding bits P in the last data block, etc. In short, information that would need to be calculated or otherwise determined can be stored as a global element of the metadata file 214 for easy retrieval.

Figure 10:
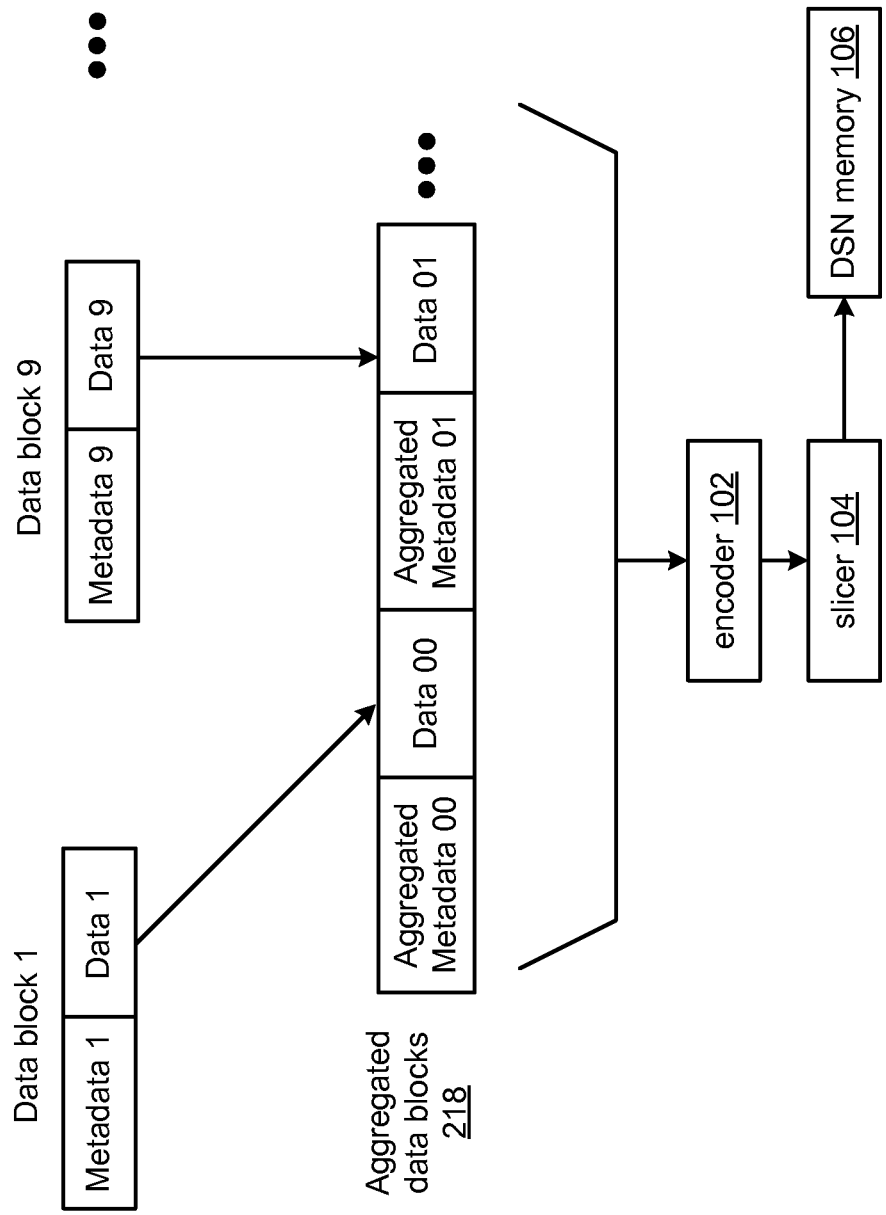
FIG. 10 is a schematic block diagram of an embodiment of data structures in accordance with the invention.

FIG. 10 is a schematic block diagram of an embodiment of data structures in accordance with the invention. In particular, a file structure is shown that includes one or more data blocks structures, and an aggregated data block structure for processing by an encoder 102, a slicer 104, and the DSN memory 106. In an embodiment of the present invention, the file structure shown is implemented via an access module, such as access module 62 of the DS processing unit

38. The access module converts one or more incoming data blocks (e.g., user data blocks for storage) in accordance with the data block structure into an aggregated data block for encoding by the encoder 102, slicing by the slicer 104, and dispersed storage by the DSN memory 106. In an embodiment of the present invention, the encoder 102, slicer 104, and DSN memory 106 are implemented via grid module 64, storage module 66, DSnet interface 68 and one or more DS storage units 44.

The access module can receive the incoming data blocks as typically 512 to 4,096 byte data blocks that, for example can be of unequal length. The data block can include metadata and data. The metadata can include a block number (e.g., of the user OS), a CRC, and the length. Note that the size of the metadata may typically be insignificant relative to the size of the data in the data block. The access module maps each incoming data block into a corresponding aggregated data block 218 of fixed size (e.g., 4,096 bytes each). Each aggregated data block 218 can include aggregated metadata and data. This one-to-one mapping of incoming data blocks to aggregated data blocks 218 can provide simpler block handling.

Consider the example shown where the access module receives data blocks 1 and 9. In this example, data block 1 includes data 1 of 512 bytes, and data block 9 includes data 9 of 1024 bytes. The access module generates, from data block 1, the aggregated data block 00 with aggregated metadata 00 and a data section 00. In particular, the 512 bytes of data 1 are packed into the data section 00. For example the 512 bytes of data 1 can be written to bytes 0-511 of the data section 00 with the unfilled portion being either unfilled or padded with a predetermined bit pattern. The aggregated metadata 00 can be generated to include information such as the actual data length (512), the original data block number (1), the original metadata, the aggregated block number (00), a new CRC for the entire aggregated data block 00, and/or other parameters as necessary.

In a similar fashion, the access module generates, from data block 9, the aggregated data block 01 with aggregated metadata 01 and a data section 01. In particular, the 1024 bytes of data 9 are packed into the data section 01 with the unfilled portion being either unfilled or padded with a predetermined bit pattern. The aggregated metadata 01 can include information such as the actual data length (1024), the original data block number (9), the original metadata, the aggregated block number (01), a new CRC for the entire aggregated data block 01, and/or other parameters as necessary.

The foregoing has been described in conjunction with the operation of the components of a DS processing device 38. In a similar fashion however, the techniques described herein can be employed by a DS storage unit 44, the user device 10 or 12, the DS managing unit 18, and/or the storage integrity processing unit 16.

Figure 11:
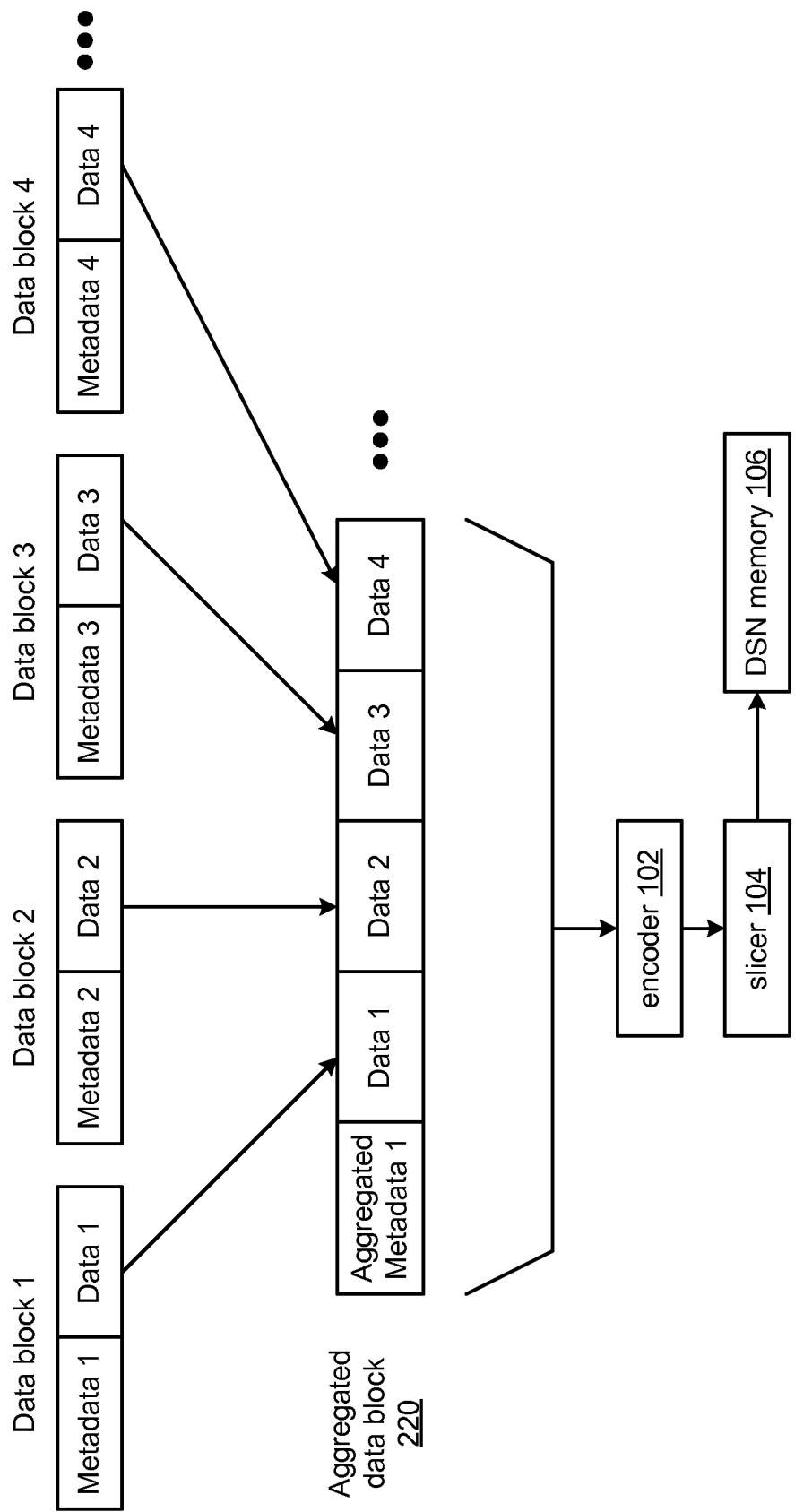
FIG. 11 is a schematic block diagram of another embodiment of data structures in accordance with the invention.

FIG. 11 is a schematic block diagram of another embodiment of data structures in accordance with the invention. In particular, a file structure is shown that includes one or more data blocks structures, and an aggregated data block structure for processing by an encoder 102, a slicer 104, and the DSN memory 106. In an embodiment of the present invention, the file structure shown is implemented via an access module, such as access module 62 of the DS processing unit 38. The access module converts one or more incoming data blocks (e.g., user data blocks for storage) in accordance with the data block structure into an aggregated data block in accordance with the aggregated data block structure for encoding by the encoder 102, slicing by the slicer 104, and dispersed storage by the DSN memory 106. In an embodiment of the present invention, the encoder 102, slicer 104, and DSN memory 106 are implemented via grid module 64, storage module 66, DSnet interface 68 and one or more DS storage units 44.

The access module can receive the incoming data blocks as typically 512 to 4,096 byte data blocks. The data block can include metadata and data. The metadata can include a block number (e.g., of the user OS), a CRC, and the length. Note that the size of the metadata can not be insignificant relative to the size of the data in the data block.

The access module can aggregate the data from one or more data blocks (e.g., 4,096 bytes each) into a larger data segment such as aggregated data block 220 (e.g., 16,384 bytes) in accordance with the aggregated data block structure. The aggregated data block 220 can include aggregated metadata and data. For example, data 1 from data block 1, data 2 from data block 2, data 3 from data block 3, and data 4 from data block 4 can comprise the data portion of the aggregated data block 220. Note that the last data block for a new series of received data blocks may not be filled. In an embodiment, the unfilled portion remains unfilled (or padded) even when a subsequent new series of data blocks is received and processed for storage. In another embodiment, the access module will determine where the last aggregated block left off and will continue to fill the previously unfilled portion by retrieving the last aggregated data block 220 from the DSN memory 106, filling it, and re-storing the full aggregated data block in the DSN memory 106 as will be discussed in greater detail with reference to FIG. 12.

The access module can create aggregated metadata based on the metadata and data of the corresponding data blocks. The aggregated metadata can include a block range (e.g., the starting and ending block numbers), a CRC over the data (e.g., for subsequent data integrity verification), and a length of the aggregated data block (e.g., bytes). In addition, the metadata can include additional parameters as described below.

In a further example of operation, access module 62 receives a new data block to be stored in the dispersed storage system. The access module 62 determines when a previous data segment contains sufficient space for the new data block. For instance, metadata associated with the aggregated data file 220 can include an indicator of the last data block, an indicator if the last data block is full or not, an indicator that the last data block includes P padding bytes and/or another indicator of the amount of unused spaced in a previously stored data segment, such as aggregated data block 220.

The access module 62 determines if a previously stored data segment contains sufficient space for the new data block. The access module 62 can, for example, access metadata associated with the aggregated data block 220 to determine if the last data block has sufficient space, however other data blocks or other segments can be used if, for example another previously stored data segment contains sufficient space to store the new data block.

When the previous data segment contains sufficient space, the access module 62 retrieves the previous data segment from one or more dispersed storage units 44, via the grid module 64, storage module 66 and DSnet interface 68. For instance, the access module 62 can command the storage module 66 and the grid module 64 to retrieve the previous data segment from the dispersed storage unit or units by retrieving a plurality of previous slices corresponding to the previous data segment and subsequently deslicing and decoding the plurality of previous slices to regenerate the previous data segment.

The access module 62 generates a revised data segment by aggregating the new data block with at least one existing data block of the previous data segment. If present, padding data can be removed from the previous data segment, for instance by being overwritten by the new data block. The access module 62 updates the aggregated metadata by aggregating the metadata for the previous data segment with the metadata the new data block. The grid module 64 generates a plurality of error coded slices for the revised data segment. The storage module 66 facilitates the storage of the plurality of slices in the plurality of dispersed storage units.

It should be noted that the access module 62 can generate the revised data segment by further padding the revised data segment with padding data to fill the revised data segment when the aggregation of the new data block with the existing data blocks of the previous data segment still does not fill the revised data segment. The access module 62 can further store an indication of available space in the aggregated metadata when the aggregation of the new data block with the at least one existing data block of the previous data segment does not fill the revised data segment. In addition, the access module 62 can store a segment filled indication when the aggregation of the new data block with the at least one existing data block of the previous data segment fills the revised data segment.

When the access module determines that the previous data segment contains insufficient space for the new data block, the access module 62 can generate a new data segment and store an indication of available space associated with the new data segment. The grid module 64 generates a plurality of error coded slices for the new data segment. The storage module 66 facilitates the storage of the plurality of slices in the plurality of dispersed storage units.

The foregoing has been described in conjunction with the operation of the components of a DS processing device 38. In a similar fashion however, the techniques described herein can be employed by a DS storage unit 44, the user device 10 or 12, the DS managing unit 18, and/or the storage integrity processing unit 16.

Figure 12:
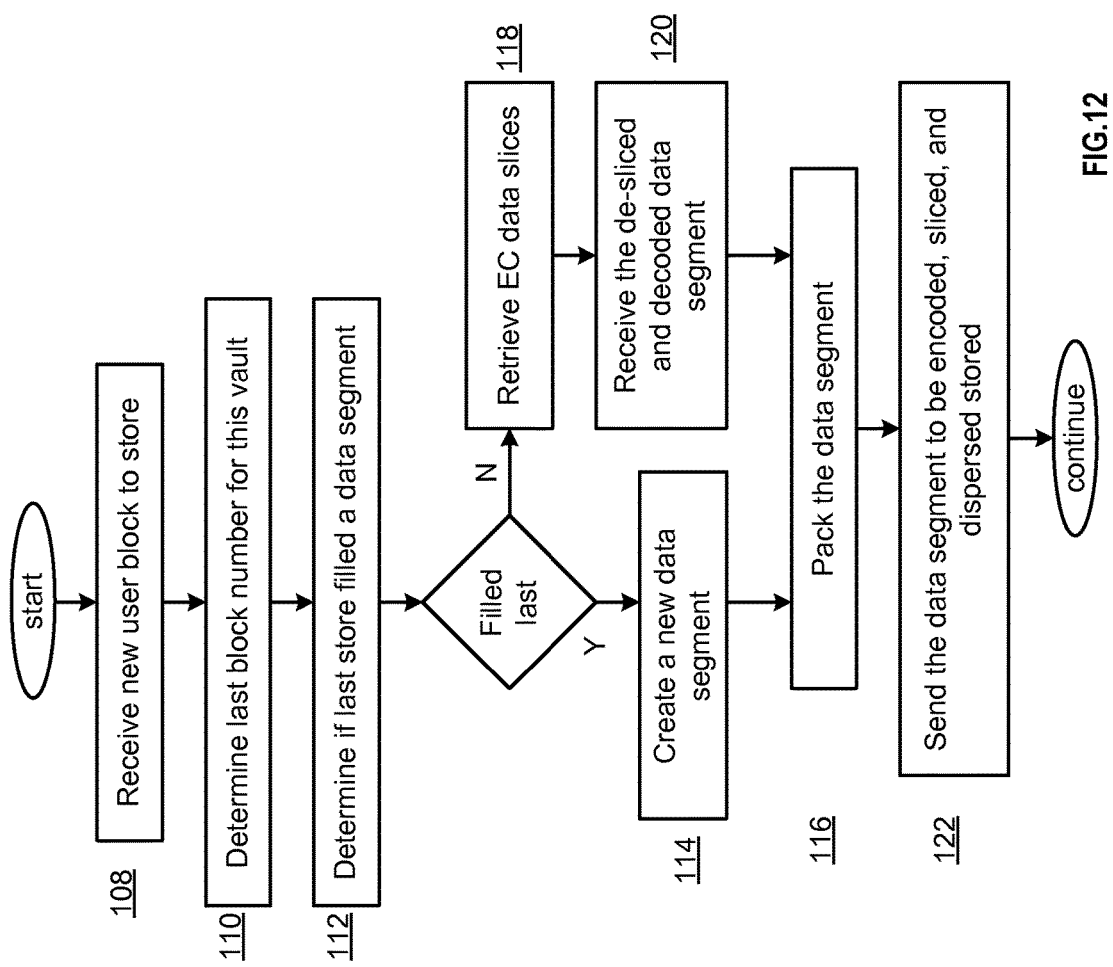
FIG. 12 is a flow chart representation of an embodiment of a method for storage dispersion in accordance with the present invention.

FIG. 12 is a flow chart representation of an embodiment of a method for storage dispersion in accordance with the present invention. In particular, a method for data storage is shown where the access module of any one of the DS processing unit, the DS storage unit, the user device, the DS managing unit, and/or the storage integrity processing unit can receive one or more user data blocks to store, prepare one or more aggregated data blocks, and initiate the dispersed storage of the one or more aggregated data blocks.

The access module can receive one or more user data blocks to store 108. The access module can determine the last aggregated block that was stored for this user 110. The determination can be based on one or more of looking up a stored value in the user vault, accessing metadata from the aggregated metadata, retrieving the data block for one data block number less than the lowest new received data block number, and/or a command. The access module can determine if the last aggregated data block stored was completely filled 112. The determination can be based on one or more of looking up a stored value in the user vault, accessing metadata from the aggregated metadata, retrieving the last aggregated data block stored, and/or a command. The access module can create a new aggregated data block (e.g., a new data segment) when last aggregated data block stored was substantially filled 114. The access module can proceed to pack the data segment described below 116.

The access module can retrieve the EC data slices from the DSN memory corresponding to the last aggregated data block stored (data segment) when last aggregated data block stored was not substantially filled and has room to store at least one more new user data block 118. The access module can receive the de-sliced and decoded data segment of the last aggregated data block stored 120.

The access module can pack the one or more new data blocks in the data segment until it is substantially full to create the aggregated data block 116. The access module can create the aggregated metadata and pack that into the data segment as the completed aggregated data block.

The access module can send the data segment (aggregated data block) to the grid module to the encoded, sliced, and dispersed stored 122.

Figure 13:
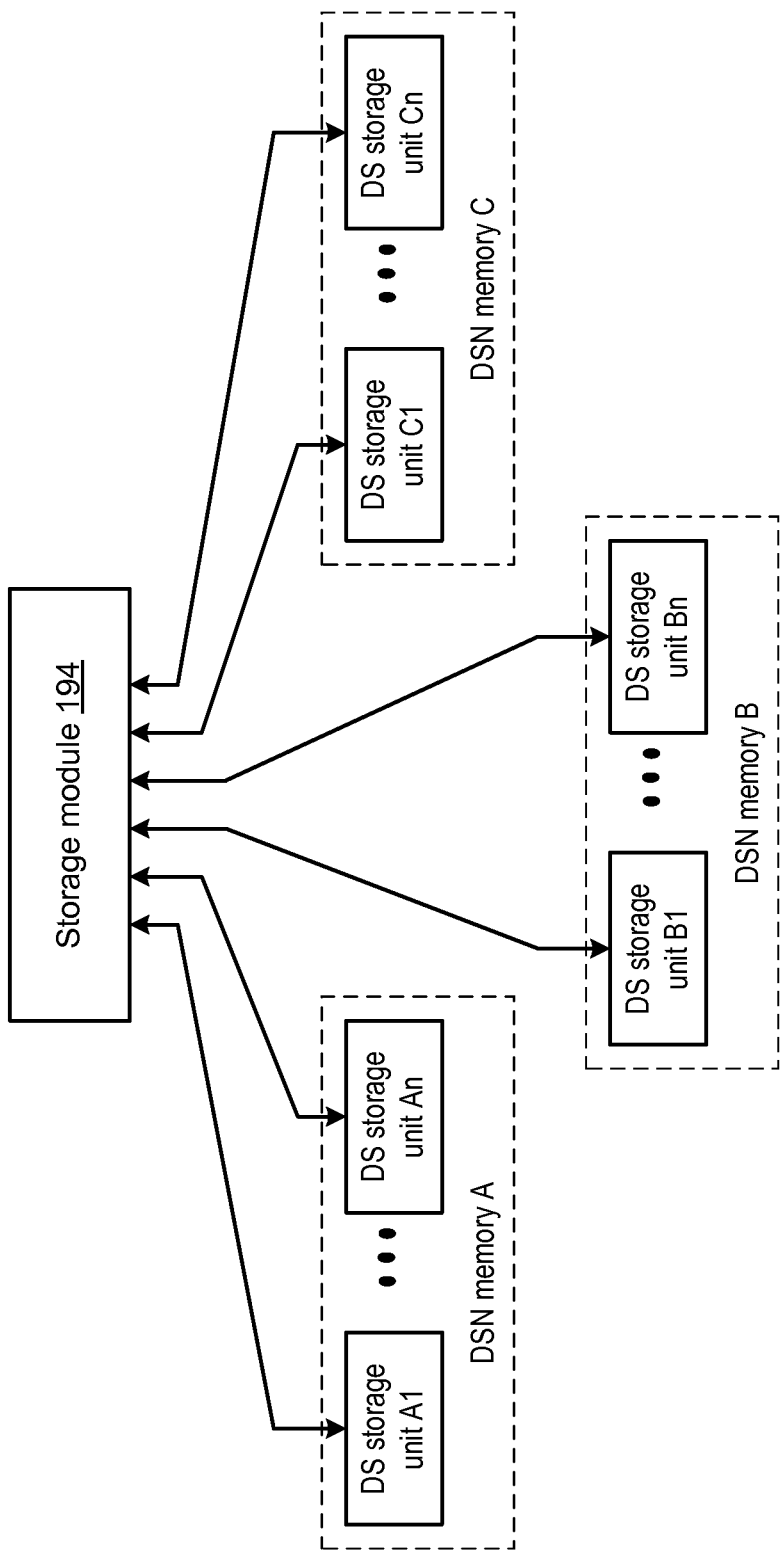
FIG. 13 is a schematic block diagram of another embodiment of a plurality of dispersed storage units in accordance with the invention.

FIG. 13 is a schematic block diagram of another embodiment of a plurality of dispersed storage units in accordance with the invention. In particular, a computing system is shown that includes the storage module 194 such as storage module 66 of DS processing module 38 or other storage module in a dispersed storage system, and one or more DSN memories. For example, DSN memory A can be a DSN memory system of a first dispersed storage provider, DSN memory B can be a DSN memory system of a second dispersed storage provider, and DSN memory C can be a DSN memory system of a third dispersed storage provider. In an example, the DSN memories can have different environmental, construction, and performance variables including different geographic regions, costs, performance, levels of security, DS storage unit operating systems, and availability. A DSN memory as a whole can be a plurality of fixed and/or portable devices with real time changes occurring in the associated variables. For example, DSN memory A can be contained within one or more fixed-wing aircraft moving together or in different directions. In another example, DSN memory C can be constructed with all Linux operating system DS storage servers and can be installed in eight different sites all with two external power feeds and a standby power generator.

The storage module 194 can determine where to disperse store EC data slices based in part on the environmental and performance variables. The storage module 194 can determine to utilize DS storage units from one or more DSN memories when the determination results in a favorable comparison of the storage requirements to the predicted storage performance. The storage module 194 can determine a favorable comparison when the predicted performance substantially meets the requirements. The storage module 194 can determine the predicted performance based in part on the environmental, construction, and performance variables. The storage module 194 can determine the requirements based on user vault operational or security parameters, a command, type of data, a security level of the data, a cost goal, a retrieval time need, an availability indicator, and/or any other metric to specify requirements.

An example of operation of a storage module, such as storage module 194 is presented. As previously discussed, a grid module, such as grid module 64 generates a plurality of data slices from a block of data to be stored in the dispersed storage system. Storage module 194 determines a plurality of dispersed storage units for storing the plurality of data slices, based on an operating system associated with each of the plurality of dispersed storage units. In particular, storage module 194 includes or is coupled to a memory that stores an indication of the operating system associated with each of the plurality of dispersed storage units in a lookup table or other data structure.

For instance, to avoid a hacker from accessing sufficient amounts of data to reconstruct the user data, data slices are distributed among X different dispersed storage units. However, the dispersed storage units are selected so that fewer than M dispersed storage units employ the same operating system, where M<T, and T represents the coding threshold—the number of data slices required to reconstruct a portion of user data. In this fashion, if a hacker (or other security threat) were to "breach" a particular operating system in order to access the data slices contained in each of the corresponding dispersed storage units, the hacker would not have access to sufficient data to reconstruct the user data. Consider the example where the X=16 and T=10, meaning that 10 of each 16 data slices are required to correctly reconstruct the user data. In this case, a choice of M=9 insures that a hacker who beaches all dispersed storage units that employ a single operating system, has less than the 10 of each 16 data slices that are required to correctly reconstruct the user data.

In a further example where data availability is a further concern, due to a virus, hacker or other security threat that could potentially disable all dispersed storage units that employ a single operating system, the dispersed storage units are selected so that M<X−T+1. Consider the example where the X=16 and T=10, meaning that 10 of each 16 data slices are required to correctly reconstruct the user data. In this case, a choice of M=6 insures that if a virus disables dispersed storage units that employ a single operating system, 10 of each 16 data slices are still available from the dispersed storage units employing other operating systems to correctly reconstruct the user data.

In an embodiment of the present invention, the storage module 194 can receive a security parameter associated with the block of data that indicates a desired level of security associated with the block of data. Different security levels can be implemented in this fashion to indicate for instance:

(a) a low level of security corresponding to, for example, M=16;

(b) a medium level of security where, for example, M=9;

(c) a high level of security where, for example, M=6

(d) a higher level of security where, for example, M=4

In this fashion, the desired level of security in the data can be translated into greater or lesser degrees of operating system diversity over the set of dispersed storage units to provide protection from security threats.

In yet another embodiment of the present invention, storage module 194 includes or is coupled to a memory that stores an indication of the operating system associated with each of the plurality of dispersed storage units in a lookup table or other data structure, and/or an indication of the security level associated with each operating system. The security parameter can itself qualify or disqualify particular dispersed storage units based on the level of security associated with the particular operating systems they employ. For example, a lower level of security, dispersed storage units with any available operating system can be qualified and employed. At higher levels of security, dispersed storage units employing one or more less secure operating systems can be disqualified, based on the security risks associated with the use of such operating systems. Said another way, the dispersed storage units used to store the user data can be selected based on whether or not the level of security associated with the operating system employed by each dispersed storage units conforms with the desired level of security. In this fashion, dispersed storage systems employing operating systems that are more prone to security breaches, viruses or other security threats can be selectively disqualified based on the security level associated with the user data.

In yet another example, storage module 194 determines a plurality of dispersed storage units for storing the plurality of data slices, based on a geographical location associated with each of the plurality of dispersed storage units. In particular, storage module 194 includes or is coupled to a memory that stores an indication of the geographical location associated with each of the plurality of dispersed storage units in a lookup table or other data structure. Indications of geographical location include a particular building, a particular address, a particular postal code; and a particular geopolitical region such as a municipality, county, parish, state, province, country or other geopolitical region.

For instance, to avoid a hacker from accessing sufficient amounts of data to reconstruct the user data, data slices are distributed among X different dispersed storage units. However, the dispersed storage units are selected so that fewer than M dispersed storage units are located within the same geographical location, where M<T, and T represents the coding threshold—the number of data slices required to reconstruct a portion of user data. In this fashion, if a hacker (or other security threat) were to "breach" a particular geographical location in order to access the data slices contained in each of the corresponding dispersed storage units, the hacker would not have access to sufficient data to reconstruct the user data. Consider the example where the X=16 and T=10, meaning that 10 of each 16 data slices are required to correctly reconstruct the user data. In this case, a choice of M=9 insures that a hacker who beaches all dispersed storage units at a single geographical location, has less than the 10 of each 16 data slices that are required to correctly reconstruct the user data.

In a further example where data availability is a further concern, due to a virus, natural disaster or other security threat that could potentially disable all dispersed storage units at a single geographical location, the dispersed storage units are selected so that M<X−T+1. Consider the example where the X=16 and T=10, meaning that 10 of each 16 data slices are required to correctly reconstruct the user data. In this case, a choice of M=6 insures that if a natural disaster disables dispersed storage units at a single geographical location, 10 of each 16 data slices are still available from the dispersed storage units employing other geographical locations to correctly reconstruct the user data.

In an embodiment of the present invention, the storage module 194 can receive a security parameter, operational parameter or other parameter associated with the block of data that indicates a desired level of security associated with the block of data. Different security levels can be implemented in this fashion to indicate for instance:

(a) a low level of security corresponding to, for example, M=16;

(b) a medium level of security where, for example, M=9;

(c) a high level of security where, for example, M=6

(d) a higher level of security where, for example, M=4

In addition, increased security level can be accompanied by a change in the size of a geographical region determined to be similar. For example, (a) a low level of security where two geographical locations are deemed to be similar if they correspond to the same building;

(b) a medium level of security where two geographical locations are deemed to be similar if they correspond to the same postal code;

(c) a high level of security where two geographical locations are deemed to be similar if they correspond to the same city; and (d) a higher level of security where two geographical locations are deemed to be similar if they correspond to the same state.

In this fashion, the desired level of security in the data can be translated into greater or lesser degrees of geographical diversity over the set of dispersed storage units to provide protection from security threats.

In yet another embodiment of the present invention, storage module 194 includes or is coupled to a memory that stores an indication of the geographical location associated with each of the plurality of dispersed storage units in a lookup table or other data structure, and/or an indication of the security level associated with each geographical location. The security parameter can itself qualify or disqualify particular dispersed storage units based on the level of security associated with the particular geographical location. For example, a lower level of security, dispersed storage units with any available geographical location can be qualified and employed. At higher levels of security, dispersed storage units employing one or more less secure geographical locations can be disqualified, based on the security risks associated with the use of such geographical locations. Said another way, the dispersed storage units used to store the user data can be selected based on whether or not the level of security associated with the geographical location of each dispersed storage units conforms with the desired level of security. In this fashion, dispersed storage systems at geographical location that are more prone to security breaches, viruses or other security threats can be selectively disqualified based on the security level associated with the user data.

In yet another example, storage module 194 determines a plurality of dispersed storage units for storing the plurality of data slices, based on a network associated with each of the plurality of dispersed storage units. In particular, storage module 194 includes or is coupled to a memory that stores an indication of the network associated with each of the plurality of dispersed storage units in a lookup table or other data structure. Indications of network include a particular type of network, e.g. wireless, wireline, and/or a particular network service provider.

For instance, where data availability is a concern, caused by a general network outage, a natural disaster or other disruption that could potentially disable all dispersed storage units associated with a particular network, the dispersed storage units are selected so that $M<X-T+1$. Consider the example where the $X=16$ and $T=10$, meaning that 10 of each 16 data slices are required to correctly reconstruct the user data. In this case, a choice of $M=6$ insures that if a network outage disables dispersed storage units coupled to a single network, 10 of each 16 data slices are still available from the dispersed storage units served by other networks to correctly reconstruct the user data.

In an embodiment of the present invention, the storage module 194 can receive a reliability parameter associated with the block of data that indicates a desired level of security associated with the block of data. Different reliability levels can be implemented in this fashion to indicate for instance:

(a) a low level of reliability corresponding to, for example, $M=16$;

(b) a medium level of reliability where, for example, $M=9$;

(c) a high level of reliability where, for example, $M=6$ (d) a higher level of reliability where, for example, $M=4$ In this fashion, the desired level of reliability in the data can be translated into greater or lesser degrees of network diversity over the set of dispersed storage units to provide protection.

In yet another embodiment of the present invention, storage module 194 includes or is coupled to a memory that stores an indication of the network associated with each of the plurality of dispersed storage units in a lookup table or other data structure, and/or an indication of the reliability associated with each network. The reliability parameter can itself qualify or disqualify particular dispersed storage units based on the level of reliability associated with the particular network. For example, a lower level of reliability, dispersed storage units with any available network can be qualified and employed. At higher levels of reliability, dispersed storage units employing one or more less reliability network can be disqualified, based on the reliability risks associated with the use of such networks. Said another way, the dispersed storage units used to store the user data can be selected based on whether or not the level of reliability associated with the network of each dispersed storage units conforms with the desired level of reliability. In this fashion, dispersed storage systems at networks that are more prone to failure can be selectively disqualified based on the reliability level associated with the user data.

The storage module 194 determination of where to store EC data slices will also be discussed with reference to FIGS. 14 and 16-19. It should be noted that while several optional functions and features are described separately, each of these functions and features can be combined in ways not specifically discussed to provide a more robust system.

Figure 14:
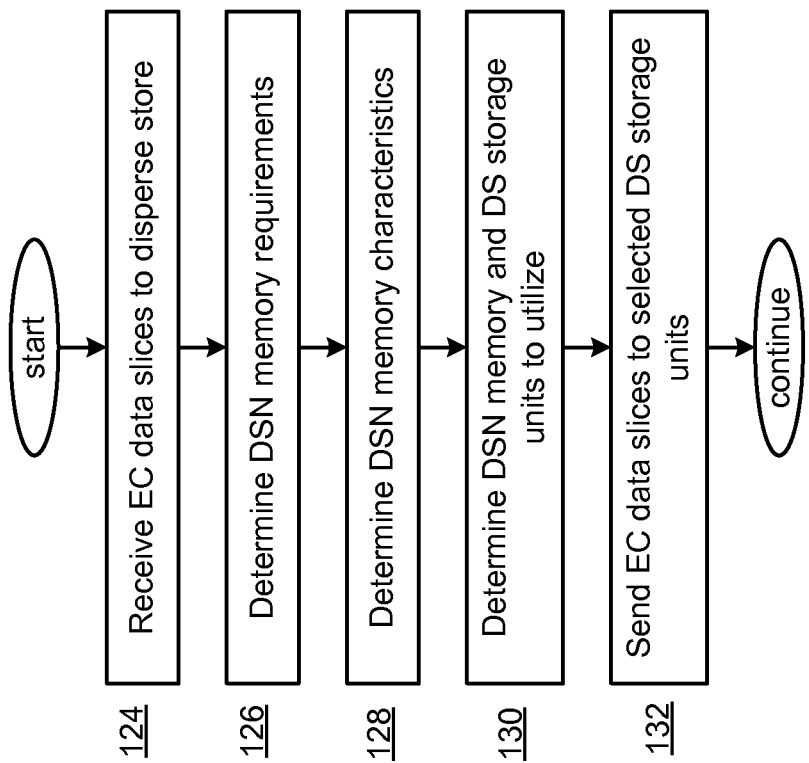
FIG. 14 is a flow chart representation of an embodiment of a method for storage dispersion in accordance with the present invention.

FIG. 14 is a flow chart representation of an embodiment of a method for storage dispersion in accordance with the present invention. In particular, a method for data storage is shown where the storage module can determine where to disperse store EC data slices based in part on the environmental and performance variables.

The storage module can receive EC data slices (e.g., from the grid module as a result of a user sending the DS processing module a new data object to store) to disperse store 124. The EC data slices can have a set of explicit storage requirements attached. The storage module can determine the DSN memory requirements based on one or more of the explicit storage requirements, user vault operational parameters, user vault security parameters, a command, type of data, a security level of the data, a cost goal, a retrieval time need, an availability indicator, and/or any other metric to specify requirements 126.

The storage module can determine the DSN memory characteristics based on one or more of a past availability record, costs, projected availability, location, predicted future location, power quality, power predicted availability, DS storage unit uptime records, speed of access performance, network link speeds, security intrusions records, operating system type in each DS storage unit, proximity to real time weather threats, proximity to natural disaster threats, and/or any other metric to characterize past performance and predict future performance 128.

The storage module can determine DSN memory and DS storage units to utilize based on a solution that maximizes the favorable comparison between the predicted performance and the requirements 130. For example, popular commercially available operating systems for general purpose computing cores can be vulnerable to intrusion attacks via exploitation of one or more security weaknesses. The storage module can determine which DS storage units are using which operating system. The storage module can choose less than the error coding threshold T number of DS storage units using the same operating system for more favorable confidentiality. The storage module can choose no more than n-k of DS storage units using the same operating system for more favorable data availability.

The storage module can send the EC data slices to the chosen DSN memory and DS storage units with a write command to store the EC data slices in the DS storage units 132.

In another embodiment, the storage module can from time to time re-determine the DSN memory characteristics and re-determine DSN memory requirements as one or both can change. The storage module can determine a different selection of DSN memory and DS storage units to utilize for data that is already stored in the one or more DSN memories. The storage module can retrieve the EC data slices and re-distribute the EC data slices to the newly chosen DSN memories and DS storage units. For example, the storage module can move some of the EC data slices when a particular DS storage unit site is in increased jeopardy of going off line due to one or more or a failing network, a weather system threat, an earthquake pattern, an act of war, local power outage patterns, and/or any other predicted scenario where EC data slices can not be available.

Figure 15:
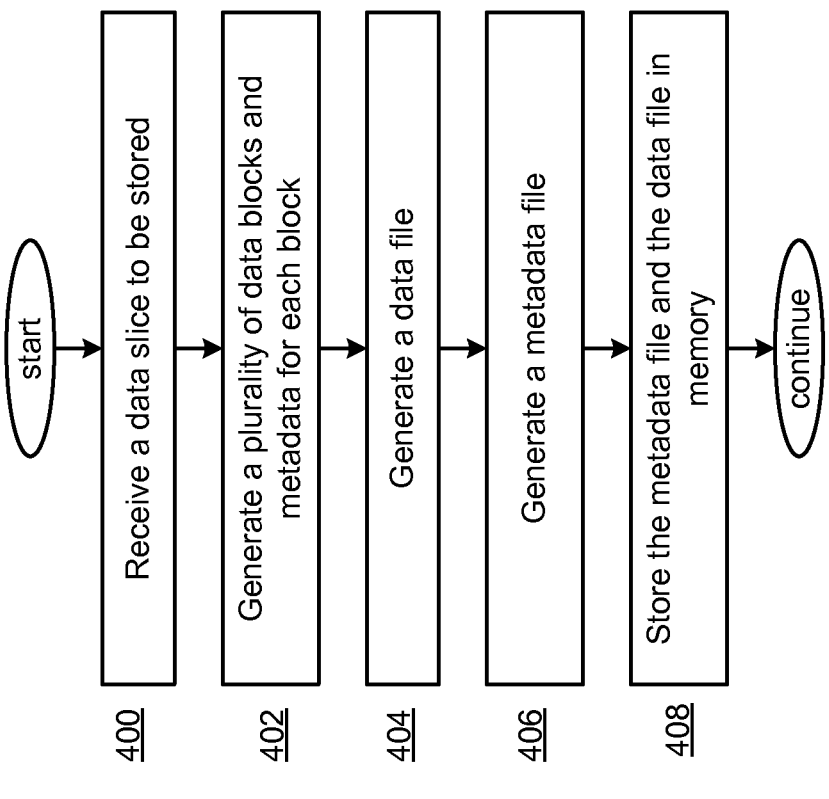
FIG. 15 is a flow chart representation of an embodiment of a method for storage dispersion in accordance with the present invention.

FIG. 15 is a flow chart representation of an embodiment of a method for storage dispersion in accordance with the present invention. In particular, a method is shown that can be used in conjunction with one or more functions and features described in conjunction with FIGS. 1-14. In step 400 a data slice to be stored in a dispersed storage unit of the dispersed storage system is received. In step 402, a plurality of data blocks are generated from the data slice and metadata associated with each of the plurality of data blocks. In step 404, a data file is generated based on the plurality of data blocks. In step 406, a metadata file is generated based on the metadata associated with the plurality of data blocks. In step 408, the metadata file and the data file are stored in at least one memory of the dispersed storage unit.

In an embodiment of the present invention, the metadata file is stored separately from the data file. The metadata file can indicate the plurality of data blocks. The metadata can includes a block number for each data block and the metadata file can include a range of block numbers corresponding to the block numbers for the plurality of data blocks. The metadata associated with the plurality of data blocks can include a checksum for each data block, and a data length for each data block.

The plurality of data blocks can be of equal length and step 403 can include padding one of the plurality of data blocks with padding data to fill the one of the plurality of data blocks. It should be noted that two or more of the plurality of data blocks can be of unequal length. The metadata file can include a compilation of the metadata associated with the plurality of data blocks. The metadata file can include at least one global data element associated with the data file.

Figure 16:
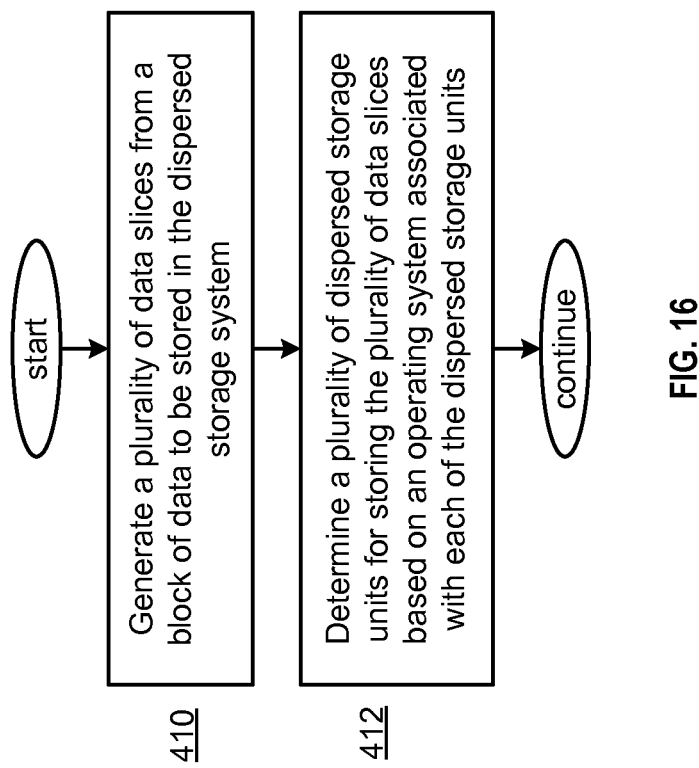
FIG. 16 is a flow chart representation of an embodiment of a method for storage dispersion in accordance with the present invention.

FIG. 16 is a flow chart representation of an embodiment of a method for storage dispersion in accordance with the present invention. In particular, a method is shown that can be used in conjunction with one or more functions and features described in conjunction with FIGS. 1-15. In step 410, a plurality of data slices are generated from a block of data to be stored in the dispersed storage system. In step 412, a plurality of dispersed storage units for storing the plurality of data slices are determined, based on an operating system associated with each of the plurality of dispersed storage units.

In an embodiment of the present invention, an indication of the operating system associated with each of the plurality of dispersed storage units is stored. When X is a total number of the plurality of dispersed storage units, step 412 can include distributing no more than M data slices to corresponding ones of the plurality of dispersed storage units associated with a single operating system. M can be less than X. M can less than a number of slices required to reconstruct the entire block of data. (X−M) can be chosen to includes a number of slices sufficient to reconstruct the block of data. Further a security parameter associated with the block of data can be received that that indicates a desired level of security associated with the block of data. M can be determined based on the security parameter.

Figure 17:
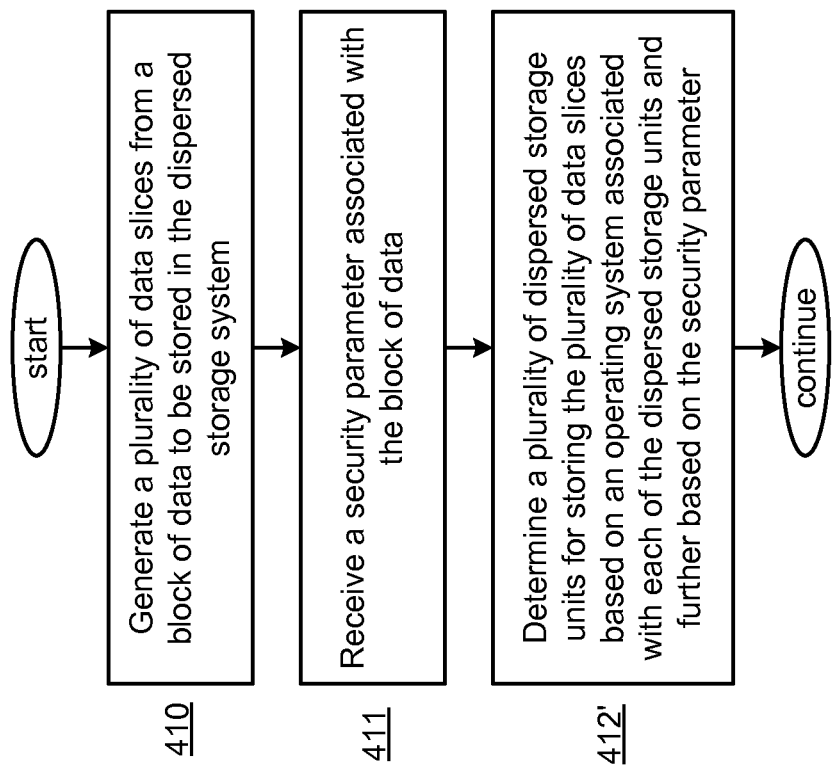
FIG. 17 is a flow chart representation of an embodiment of a method for storage dispersion in accordance with the present invention.

FIG. 17 is a flow chart representation of an embodiment of a method for storage dispersion in accordance with the present invention. In particular, a method is shown that can be used in conjunction with one or more functions and features described in conjunction with FIGS. 1-16. In step 411, a security parameter associated with the block of data is received that indicates a desired level of security associated with the block of data. In step 412' the plurality of dispersed storage units is further determined based on the security parameter. In a particular case, an indication of a security level can be stored for the operating system associated with each of the plurality of dispersed storage units and step 412' can include determining when the level of security associated with each of the plurality of dispersed storage units conforms with the desired level of security.

FIG. 18 is a flow chart representation of an embodiment of a method for storage dispersion in accordance with the present invention. In particular, a method is shown that can be used in conjunction with one or more functions and features described in conjunction with FIGS. 1-17. In step 420, a plurality of data slices are generated from a block of data to be stored in the dispersed storage system. In step 422, a plurality of dispersed storage units for storing the plurality of data slices are determined, based on geographical location associated with each of the plurality of dispersed storage units.

In an embodiment of the present invention, an indication of the geographical location associated with each of the plurality of dispersed storage units is stored. When X is a total number of the plurality of dispersed storage units, step 412 can include distributing no more than M data slices to corresponding ones of the plurality of dispersed storage units associated with a single geographical location. M can be less than N. M can less than a number of slices required to reconstruct the entire block of data. (X−M) can be chosen to includes a number of slices sufficient to reconstruct the block of data. Further a security parameter associated with the block of data can be received that indicates a desired level of security associated with the block of data. M can be determined based on the security parameter.

FIG. 19 is a flow chart representation of an embodiment of a method for storage dispersion in accordance with the present invention. In particular, a method is shown that can be used in conjunction with one or more functions and features described in conjunction with FIGS. 1-18. In step 421, a security parameter associated with the block of data is received that indicates a desired level of security associated with the block of data. In step 422' the plurality of dispersed storage units is further determined based on the security parameter. In a particular case, an indication of a security level can be stored for the geographical location associated with each of the plurality of dispersed storage units and step 422' can include determining when the level of security associated with each of the plurality of dispersed storage units conforms with the desired level of security.

FIG. 20 is a flow chart representation of an embodiment of a method for storage dispersion in accordance with the present invention. In particular, a method is shown that can be used in conjunction with one or more functions and features described in conjunction with FIGS. 1-19. In step 430, a new data block to be stored in the dispersed storage system is received. In step 432, a revised data segment is generated by aggregating the new data block into an existing data segment stored in a plurality of dispersed storage units.

FIG. 21 is a flow chart representation of an embodiment of a method for storage dispersion in accordance with the present invention. In particular, a method is shown that can be used in conjunction with one or more functions and features described in conjunction with FIGS. 1-20. In step 440 a plurality of data blocks are received to be stored in the dispersed storage system, each of the plurality of data blocks including data block metadata and data. In step 442, each of the plurality of data blocks is mapped to a corresponding one of a plurality of aggregated data blocks of fixed length. In step 444, the data from each of the a plurality of data blocks is packed into a data section of the corresponding one of the plurality of aggregated data blocks, wherein data from at least one of the plurality of data blocks has a length that is less than a length of the data section of the corresponding one of the plurality of aggregated data blocks. In step 446, aggregated metadata is generated for each of the plurality of aggregated data blocks, based in part on the data block metadata from a corresponding one of the plurality of data blocks. In step 448, the plurality of aggregated data blocks are stored in a plurality of dispersed storage units.

As can be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As can also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but can adjust its current level, voltage level, and/or power level. As can further be used herein, inferred coupling (i.e., where one element is coupled to another element by inference) includes direct and indirect coupling between two items in the same manner as "coupled to". As can even further be used herein, the term "operable to" indicates that an item includes one or more of power connections, input(s), output(s), etc., to perform one or more its corresponding functions and can further include inferred coupling to one or more other items. As can still further be used herein, the term "associated with", includes direct and/or indirect coupling of separate items and/or one item being embedded within another item. As can be used herein, the term "compares favorably", indicates that a comparison between two or more items, signals, etc., provides a desired relationship. For example, when the desired relationship is that signal 1 has a greater magnitude than signal 2, a favorable comparison can be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks can also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for use in a dispersed storage system, the method comprising:
   dispersed storage error encoding a block of data to produce a plurality of encoded data slices, wherein the plurality of encoded data slices includes a total number of encoded data slices and wherein a decode threshold number of encoded data slices, less than the total number of encoded data slices of the plurality of encoded data slices, are needed to recover the block of data;
   determining a desired level of security of the block of data to provide protection from potential security threats, the level of security increasing based on increasing operating system diversity over a plurality of dispersed storage units;
   determining an indication of a security level associated with each of a first operating system and a second operating system used by respective storage units of the plurality of dispersed storage units, wherein the first operating system is different than the second operating system;
   determining the plurality of dispersed storage units for storing the plurality of encoded data slices based on the desired level of security of the block of data, wherein a first subset of the plurality of dispersed storage units uses the first operating system and a second subset of the plurality of dispersed storage units uses the second operating system, wherein a number of dispersed storage units in each of the first and second subsets is less than the decode threshold number, and wherein the indication of a security level associated with each of the first operating system and the second operating system compare favorably with the desired level of security of the block of data; and sending write requests to the plurality of dispersed storage units to store the plurality of encoded data slices, wherein each of the first and second subsets of the plurality of dispersed storage units stores less than the decode threshold number of encoded data slices.

2. The method of claim 1 further comprising:

storing an indication of the operating system employed by each of the plurality of dispersed storage units.

3. The method of claim 1 further comprises:

sending the write requests to the plurality of dispersed storage units such that each dispersed storage units stores one encoded data slice of the plurality of encoded data slices.

4. The method of claim 1, wherein the determining the plurality of dispersed storage units comprises:

identifying a third subset of the plurality of dispersed storage units that uses a third operating system.

5. The method of claim 1 further comprises:

generating the write requests such that each of the first and the second subsets of the plurality of dispersed storage units stores less than the decode threshold number of encoded data slices.

6. A dispersed storage processing unit for use in a dispersed storage system, the dispersed storage processing unit comprising:

a grid module for dispersed storage error encoding a block of data to produce a plurality of encoded data slices, wherein the plurality of encoded data slices includes a total number of encoded data slices and wherein a decode threshold number of encoded data slices, less than the total number of encoded data slices of the plurality of encoded data slices, are needed to recover the block of data;

a storage module, coupled to the grid module, for:

determining a desired level of security of the block of data to provide protection from potential security threats, the level of security increasing based on increasing operating system diversity over a plurality of dispersed storage units;

determining an indication of a security level associated with each of a first operating system and a second operating system used by respective storage units of the plurality of dispersed storage units, wherein the first operating system is different than the second operating system;

determining the plurality of dispersed storage units for storing the plurality of encoded data slices based on the desired level of security of the block of data, wherein a first subset of the plurality of dispersed storage units uses the first operating system and a second subset of the plurality of dispersed storage units uses the second operating system, wherein a number of dispersed storage units in each of the first and second subsets is less than the decode threshold number, and wherein the indication of a security level associated with each of the first operating system and the second operating system compare favorably with the desired level of security of the block of data; and sending write requests to the plurality of dispersed storage units to store the plurality of encoded data slices, wherein each of the first and second subsets of the plurality of dispersed storage units stores less than the decode threshold number of encoded data slices.

7. The dispersed storage processing unit of claim 6 further comprising:

a memory, coupled to the storage module, configured to store an indication of the operating system employed by each of the plurality of dispersed storage units.

8. The dispersed storage processing unit of claim 6, wherein the storage module is further operable to:

send the write requests to the plurality of dispersed storage units such that each dispersed storage units stores one encoded data slice of the plurality of encoded data slices.

9. The dispersed storage processing unit of claim 6, wherein the storage module further determines the plurality of dispersed storage units by:

identifying a third subset of the plurality of dispersed storage units that uses a third operating system.

10. The dispersed storage processing unit of claim 6, wherein the storage module is further operable to:

generate the write requests such that each of the first and the second subsets of the plurality of dispersed storage units stores less than the decode threshold number of encoded data slices.

* * * * *